(12) United States Patent
Wilson

(10) Patent No.: US 9,690,258 B2
(45) Date of Patent: *Jun. 27, 2017

(54) ELECTRONIC DEVICE CASING

(71) Applicant: Wimo Labs LLC, Irvine, CA (US)

(72) Inventor: Scott H. Wilson, Chicago, IL (US)

(73) Assignee: Wimo Labs LLC, Chicago, IL (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/822,633

(22) Filed: Aug. 10, 2015

(65) Prior Publication Data

US 2015/0342308 A1     Dec. 3, 2015

Related U.S. Application Data

(63) Continuation-in-part of application No. 14/635,562, filed on Mar. 2, 2015, now Pat. No. 9,101,184, which
(Continued)

(51) Int. Cl.
    *A44C 5/14* (2006.01)
    *A44C 5/00* (2006.01)
    (Continued)

(52) U.S. Cl.
    CPC ............ *G04B 37/1486* (2013.01); *A45F 5/00* (2013.01); *G06F 1/163* (2013.01); *A44C 5/14* (2013.01);
    (Continued)

(58) Field of Classification Search
    CPC ........ A44C 5/14; A45F 5/00; A45F 2005/008; G04B 37/1486
    (Continued)

(56) References Cited

U.S. PATENT DOCUMENTS

| 2,032,696 A | 3/1936 | Goldblatt |
| 2,136,625 A | 11/1938 | Lasko |

(Continued)

FOREIGN PATENT DOCUMENTS

| JP | 2009268041 A | 11/2009 |
| KR | 200202216 | 11/2000 |
| KR | 20080093178 A | 10/2008 |

OTHER PUBLICATIONS

International Search Report and Written Opinion for PCT/US2012/020343, dated Aug. 30, 2012.

*Primary Examiner* — Adam Waggenspack
*Assistant Examiner* — Lester L Vanterpool
(74) *Attorney, Agent, or Firm* — Neal, Gerber & Eisenberg LLP

(57) ABSTRACT

A wearable electronic device holder having a retention member for retaining an electronic device, such as a smartwatch or an MP3 player, and a wrist strap attached to the retention member is disclosed. The retention member includes a protective frame comprising one or more covers or openings for receiving and allowing interaction with one or more buttons, knobs, and/or ports of the electronic device. At least one of the covers is configured to enable the dual-action functionality of a knob of the electronic device. The protective frame may also include an opening adapted to receive sound-permeable, waterproof inserts for an audio port of the electronic device. The protective frame further includes fastening holes for attachment to the wrist strap. The protective frame may be a two-piece frame that partially encloses the electronic device.

20 Claims, 21 Drawing Sheets

Related U.S. Application Data is a continuation of application No. 13/344,375, filed on Jan. 5, 2012, now Pat. No. 8,967,437.

(60) Provisional application No. 62/150,652, filed on Apr. 21, 2015, provisional application No. 61/429,917, filed on Jan. 5, 2011.

(51) Int. Cl.
*A45F 5/00* (2006.01)
*G04B 37/14* (2006.01)
*G06F 1/16* (2006.01)

(52) U.S. Cl.
CPC . *A45F 2005/008* (2013.01); *A45F 2200/0508* (2013.01); *A45F 2200/0525* (2013.01)

(58) Field of Classification Search
USPC ....... 224/165, 152, 219, 221, 222, 170, 180, 224/164, 168
See application file for complete search history.

(56) References Cited

U.S. PATENT DOCUMENTS

| | | | |
|---|---|---|---|
| 2,188,471 A | 1/1940 | Bridler | |
| 3,010,627 A | 11/1961 | Hoover | |
| 4,106,677 A | 8/1978 | Helmso et al. | |
| 4,135,805 A | 1/1979 | Taylor et al. | |
| 4,136,805 A * | 1/1979 | Storms | A45F 5/00 224/219 |
| 4,266,400 A | 5/1981 | Tabata | |
| 5,008,864 A | 4/1991 | Yoshitake | |
| 5,274,613 A | 12/1993 | Seager | |
| 6,126,070 A | 10/2000 | Fukuzumi | |
| 6,158,884 A | 12/2000 | Lebby et al. | |
| 6,360,928 B1 | 3/2002 | Russo | |
| 6,459,890 B1 | 10/2002 | Kim | |
| 6,549,791 B1 | 4/2003 | Jeon et al. | |
| 6,726,070 B2 * | 4/2004 | Lautner | A44C 5/0007 224/221 |
| 6,742,685 B2 | 6/2004 | Williams | |
| 6,757,390 B2 | 6/2004 | Ito et al. | |
| 6,880,737 B2 | 4/2005 | Bauer | |
| 7,243,824 B2 | 7/2007 | Tabata | |
| D548,457 S | 8/2007 | Reinerio | |
| 7,296,752 B2 | 11/2007 | Carnevali | |
| 7,334,711 B1 | 2/2008 | Winters | |
| 7,424,110 B1 | 9/2008 | Whiten, III | |
| 7,469,809 B2 | 12/2008 | Rodarte et al. | |
| 7,529,155 B2 | 5/2009 | Fasciano | |
| 7,764,488 B2 | 7/2010 | Calvarese | |
| 8,140,131 B1 | 3/2012 | Green | |
| 8,328,055 B1 | 12/2012 | Snyder | |
| 8,345,412 B2 | 1/2013 | Maravilla et al. | |
| 8,534,514 B2 * | 9/2013 | Zhu | A45F 5/00 224/152 |
| 8,616,423 B2 | 12/2013 | Wizikowski | |
| 8,662,362 B1 * | 3/2014 | Bastian | H04B 1/3888 224/197 |
| 8,967,437 B2 * | 3/2015 | Wilson | A45F 5/00 224/152 |
| 9,101,184 B2 * | 8/2015 | Wilson | A44C 5/14 |
| 2003/0213822 A1 | 11/2003 | Lautner | |
| 2005/0145657 A1 | 7/2005 | Norberg | |
| 2007/0215663 A1 | 9/2007 | Chongson et al. | |
| 2008/0017678 A1 | 1/2008 | Anderson et al. | |
| 2009/0039121 A1 | 2/2009 | Paul | |
| 2009/0044825 A1 | 2/2009 | Lawrence et al. | |
| 2009/0321483 A1 | 12/2009 | Froloff | |
| 2010/0192356 A1 | 8/2010 | Zadesky et al. | |
| 2010/0327030 A1 | 12/2010 | Yang | |

\* cited by examiner

ELECTRONIC DEVICE CASING

CROSS REFERENCE TO RELATED APPLICATIONS

This application claims priority to the Apr. 21, 2015 filing date of U.S. Provisional Application No. 62/150,652 and is a continuation in part of U.S. application Ser. No. 14/635,562, filed on Mar. 2, 2015 and entitled "ELECTRONIC DEVICE CASING," which is a continuation in part of U.S. application Ser. No. 13/344,375, now U.S. Pat. No. 8,967,437, filed on Jan. 5, 2012 and entitled "Electronic Device Holder," which claims priority to the Jan. 5, 2011 filing date of U.S. Provisional Application No. 61/429,917, entitled "Wristband," all of which are incorporated herein by reference in their entirety

TECHNICAL FIELD OF THE INVENTION

The present device relates to a holder for an electronic device. Particularly, the device relates to a wristband and a housing for retaining the electronic device within a secure area.

BACKGROUND OF THE INVENTION

Wristwatches are becoming more and more scarce it seems, as people want more than time related features from their electronic devices. It isn't enough that a watch can tell time in different countries or languages. It isn't enough that a watch can act as an alarm, stop watch and timer, with the push of any number of different bezel-mounted buttons. With the advent of MP3 players, smart phones, smart pads and other wireless computing devices, the time for Dad's (or Grandpa's) multi-function wristwatch has passed.

People want multi-touch control. They want game, personal, and productivity applications at their fingertips. They want music with download capabilities. However, they also want elegance to go with all that functionality. The ability to remain feminine or masculine and stylish is a need that has gone unappreciated by those designers attempting to take advantage of the popularity of devices such as the Apple® iPod nano MP3 player. Belt clips, pocket clips and arm bands are neither elegant nor stylish, and are inconvenient to use because they require regular attachment and detachment.

Further, people want more from their electronic devices, such as MP3 players or smartwatches. With respect to MP3 players, it isn't enough to provide a housing with a clip for attaching to an article of clothing. The device must be capable of integration into a user's particular lifestyle, not just as a running/walking/exercise accessory. While smartwatches have started to gain popularity, existing designs are limited to manufacturer-provided watch straps that provide some variance in aesthetics but no additional functionality or device protection. For example, for people with an active lifestyle, there is a need for a smartwatch that can be used seamlessly between work, the gym, outdoors, on weekends, etc. Moreover, just as people protect their cell phones with cases, there is a need to develop case protection for smart watches. As the electronic device manufactures fail to fill this need, a holder for such devices becomes more imperative.

The present device solves these and other problems associated with prior art devices. The present device provides a beautifully aesthetic and completely functional means for carrying an MP3 player, such as the Apple® iPod nano, and/or a smartwatch, such as the Apple® Watch, while allowing the user to have ready access to all the features of the electronic device without the need for detaching and reattaching associated with most existing holders.

SUMMARY OF THE INVENTION

There is disclosed herein an improved holder or casing for carrying an electronic device, such as an MP3 player (e.g., the Apple® iPod nano) and/or a smartwatch (e.g., the Apple® Watch), which avoids many of the disadvantages of prior devices while affording additional structural and operating advantages.

Generally speaking, the holder comprises a retention member for retaining an electronic device having a multi-touch screen, and a strap or clip attached to the retention member to allow fastening to any number of articles, including a user's wrist. The retention of the electronic device within the retention member may be accomplished in a variety of ways.

In one embodiment, the holder is a wristband and the electronic device is secured by friction fitting the device into a recessed area of the retention member. Two somewhat flexible ridges engage the device along two opposing edges. The device may be inserted through a face opening on the retention member or, alternately, the device may slide into place through a side opening. An opening on a back surface of the retention member allows the player to be pushed from the recessed area, if desired.

In another embodiment, the holder is a wristband and the retention member is comprised of a two-piece frame which at least partially encloses the electronic device. The frame pieces affix to a wristband strap as they are secured to one another.

In still another embodiment, the holder is a lock with a two-piece retention member similar to that of the previously described embodiment. The clasp of the lock may include a carabineer clip to make frequent attachment and removal of the holder easier and quicker.

In another embodiment, a rear frame component and a front frame component join together around a wearable device and cooperate to form eyelets through which a pin is inserted to retain a wearable strap. In another embodiment, the front frame component provides four eyelets to independently retain the strap, while the rear portion press fits in to place around the mobile device. These geometries can comprise the seals and films described in the '562 application so as to make them waterproof.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
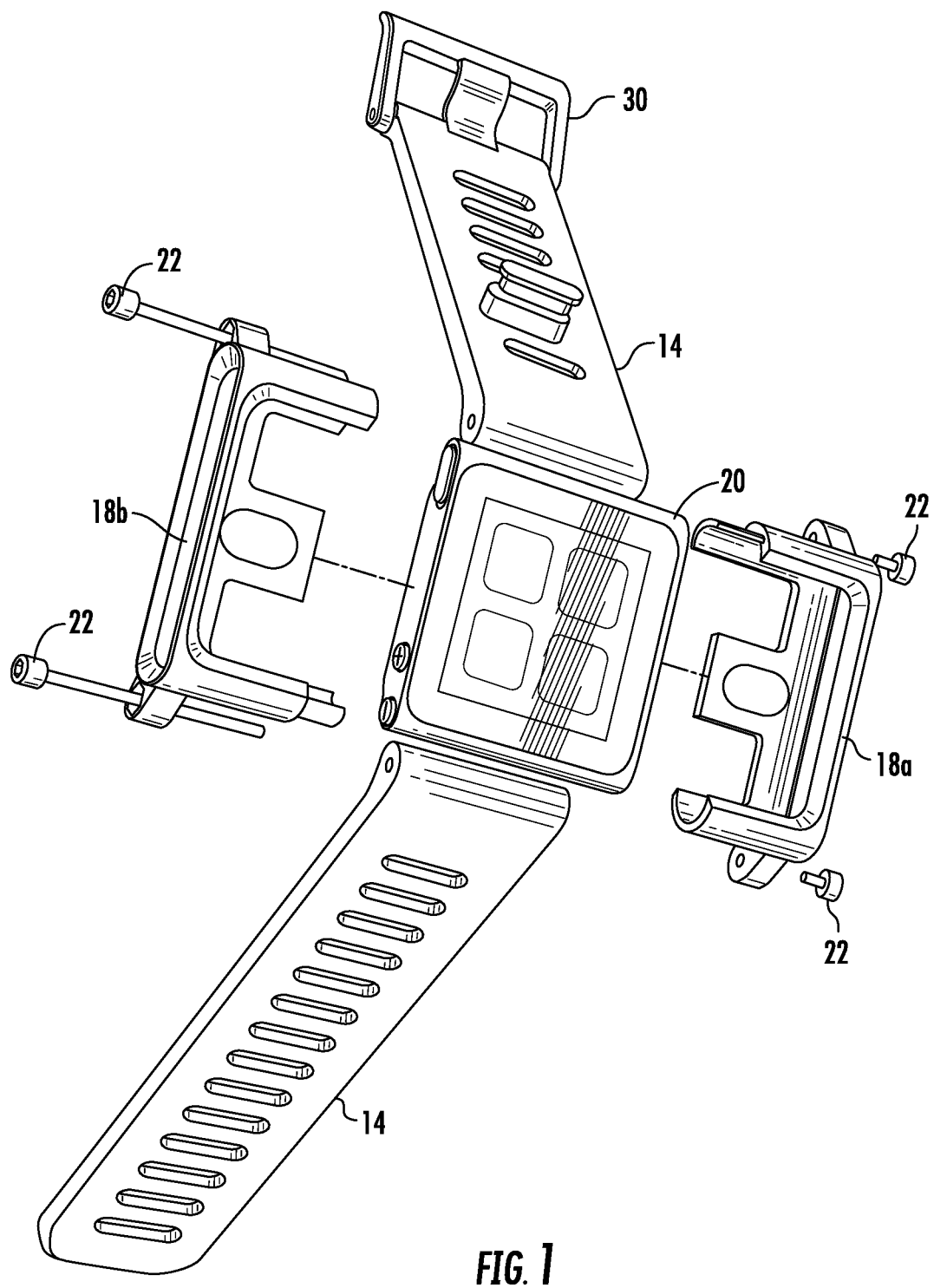
FIG. 1 is a front exploded view of an embodiment of the present device illustrating the capture and retention of an electronic device.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-7, there is illustrated embodiments of a wristband, generally designated by the numeral 10. The wristband 10 has a retention member 12 and a strap 14 which allows attachment of the entire device to, preferably, a user's wrist. The retention member 12 retains an electronic device 20, such as an MP3 player (e.g., an Apple® iPod nano (6th generation) as shown), or a smartwatch (e.g., an Apple® Watch), which then allows access to the functionality of the device as, for example, a wristwatch, a radio, a game console or the like. While the Apple® iPod nano is the only illustrated and the preferred electronic device for the disclosed embodiments, the wristband 10 is not limited to use with this device. It is anticipated that many other electronic devices may be readily adapted for mounting within the disclosed and claimed wristband with only slight modifications necessary.

For example, mobile phones, communication devices, calculators, heart/health monitors, GPS devices, analog/digital watches and countless other electronic gadgets may be configured to be worn within wristband 10. Only the retention member 12 need be adapted to the shape and controls of such gadgets. The retention member 12, in different embodiments, may provide one of either a quick and temporary retention of the device 20 or a more permanent retention, as desired by the user.

Figure 2:
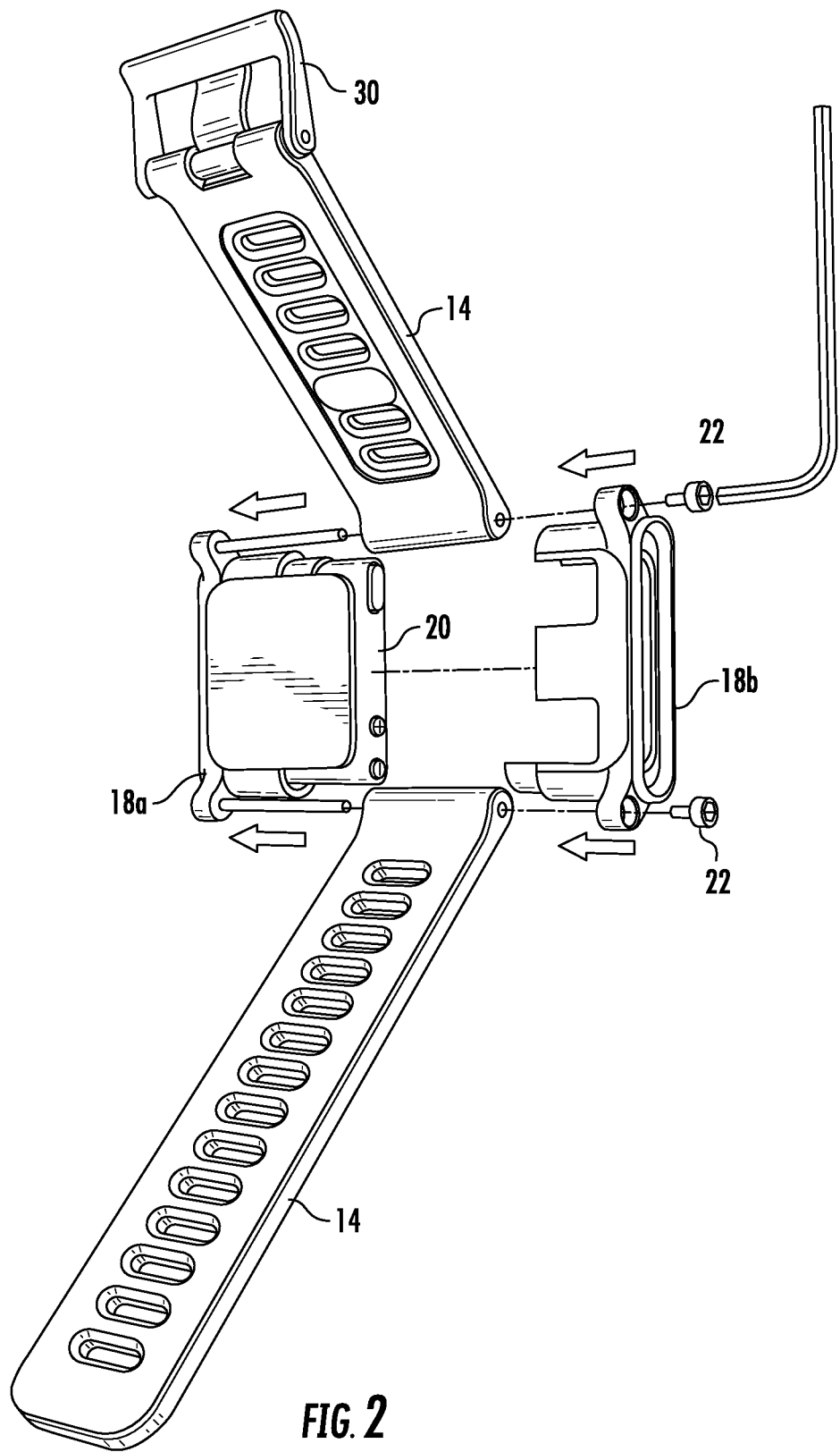
FIG. 2 is a rear exploded view of the embodiment of the present device shown in FIG. 1.
Figure 5:
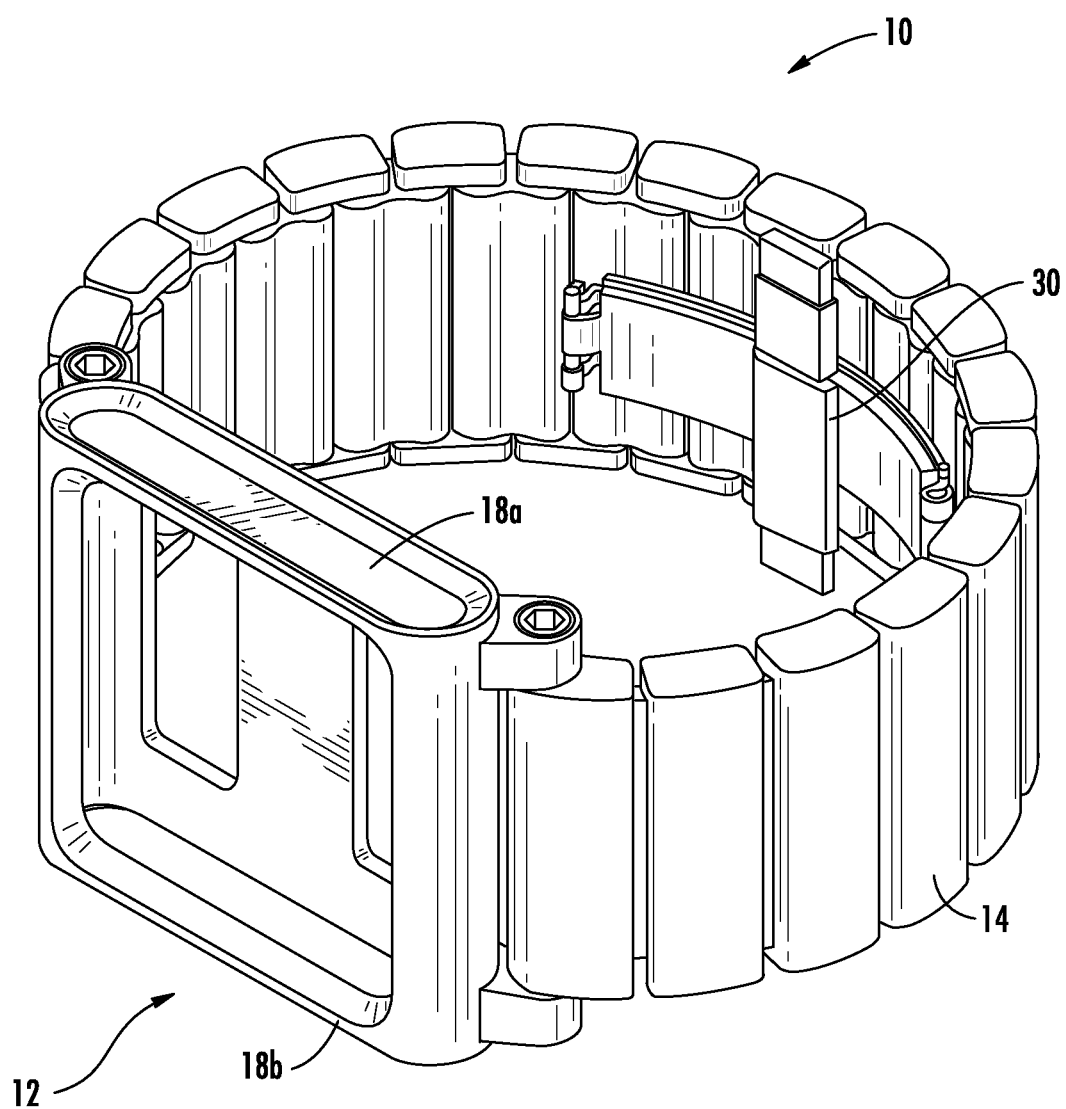
FIG. 5 is a perspective view of an embodiment similar to that of FIG. 3, except it includes a metal-link wristband.
Figure 6:
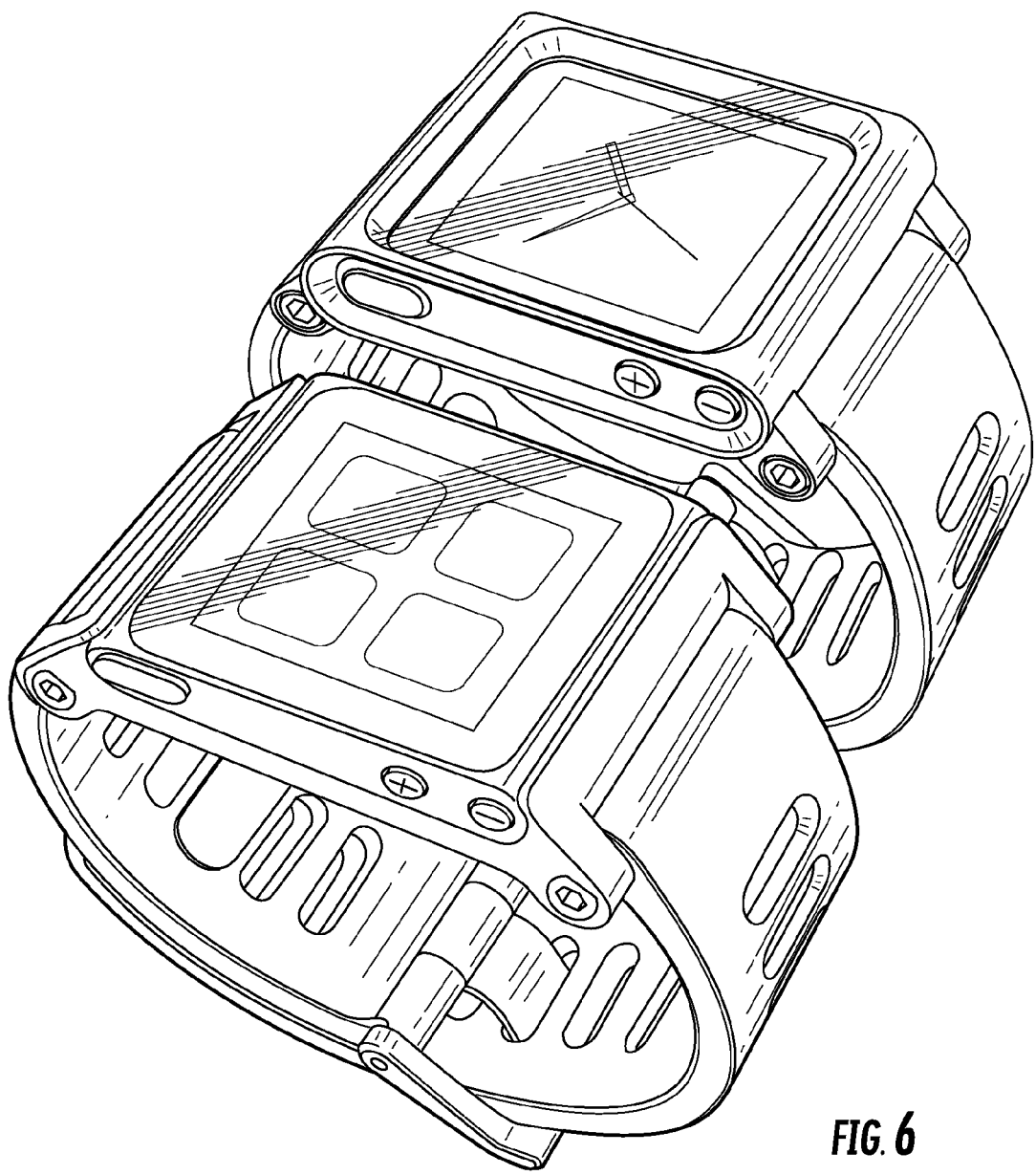
FIG. 6 is a perspective view of the embodiments of FIGS. 1 and 3 side-by-side.
Figure 7:
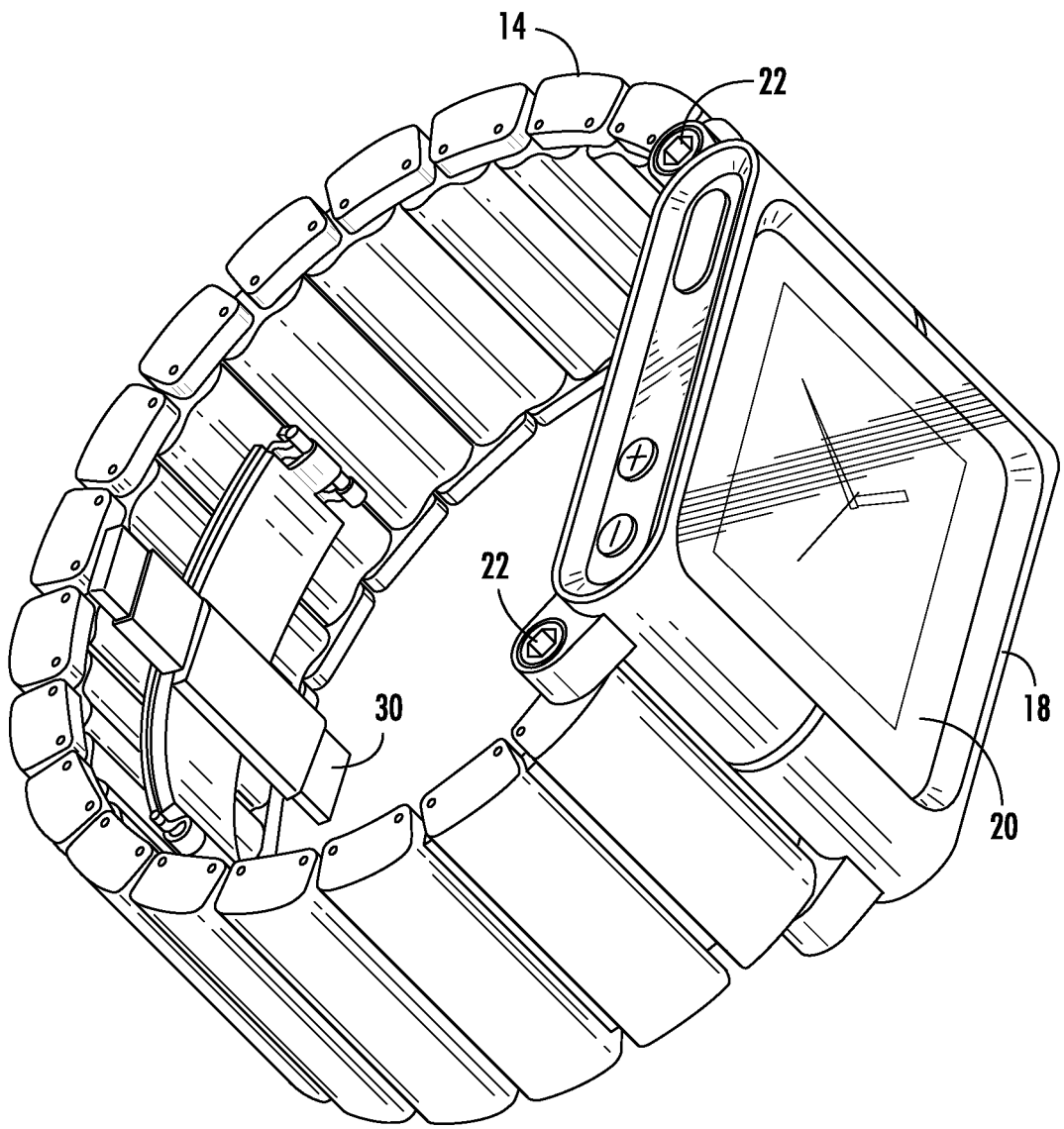
FIG. 7 is a perspective view of the embodiment of FIG. 5, including a seated electronic device.

In the embodiments of FIGS. 1, 2 and 5, the retention member 12 is preferably comprised of a two-piece frame 18 (also referred to herein as 18a and 18b). Of course, while frames of more complex configurations may be used, the two-piece frame 18 illustrated provides a secure retention of the electronic device 20 with minimal obscuring of the user screen and button controls. The illustrated two-piece frame 18 is preferably forged from aerospace grade aluminum which is machined to a final form on a CNC machine. Of course, other materials and methods may provide suitable results for some applications. The preferred machined frame members have appropriate openings to provide access to both the screen, for viewing and touch-screen interface, and button controls. However, the aluminum components also encase the device 20 sufficiently to provide protection of the same screen and button controls, and protection against accidental detachment of the electronic device 20 as well.

The two frame members 18a and 18b can be connected to one another after being placed about the electronic device 20 by two pairs of suitable fastening pins 22, as shown. The fastening pins 22 not only connect the two frame members 18a and 18b together, but also pass through the strap ends to attach these to the retention member 12 as well. A unique aspect of the two-piece frame 18, as discernible in FIGS. 1 and 2, is that the two halves are identical. That is, the right half 18a is the same as the left half 18b, only rotated 180°. By using two identical pieces, much time and cost is saved in both manufacture and assembly of the retention member 12 in this embodiment. Further, in the event of loss or damage to one side, replacement can be made without having to "orphan" a mating side and without having to replace an undamaged or remaining side. The resulting retention member 12 is symmetrical top-to-bottom, as well as side-to-side.

Figure 3:
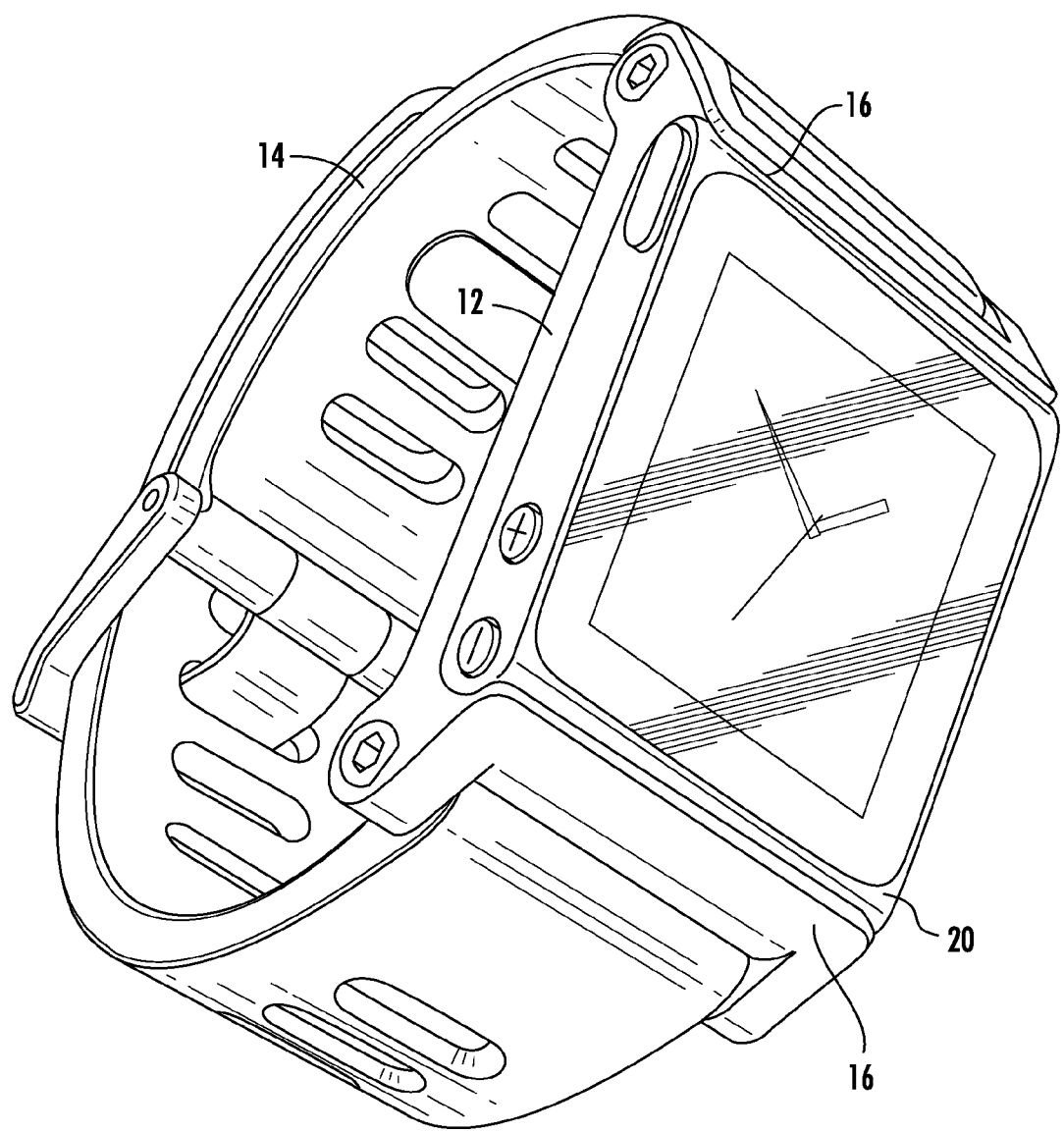
FIG. 3 is a front perspective of another embodiment of the present device illustrating the insertion of an electronic device.
Figure 4:
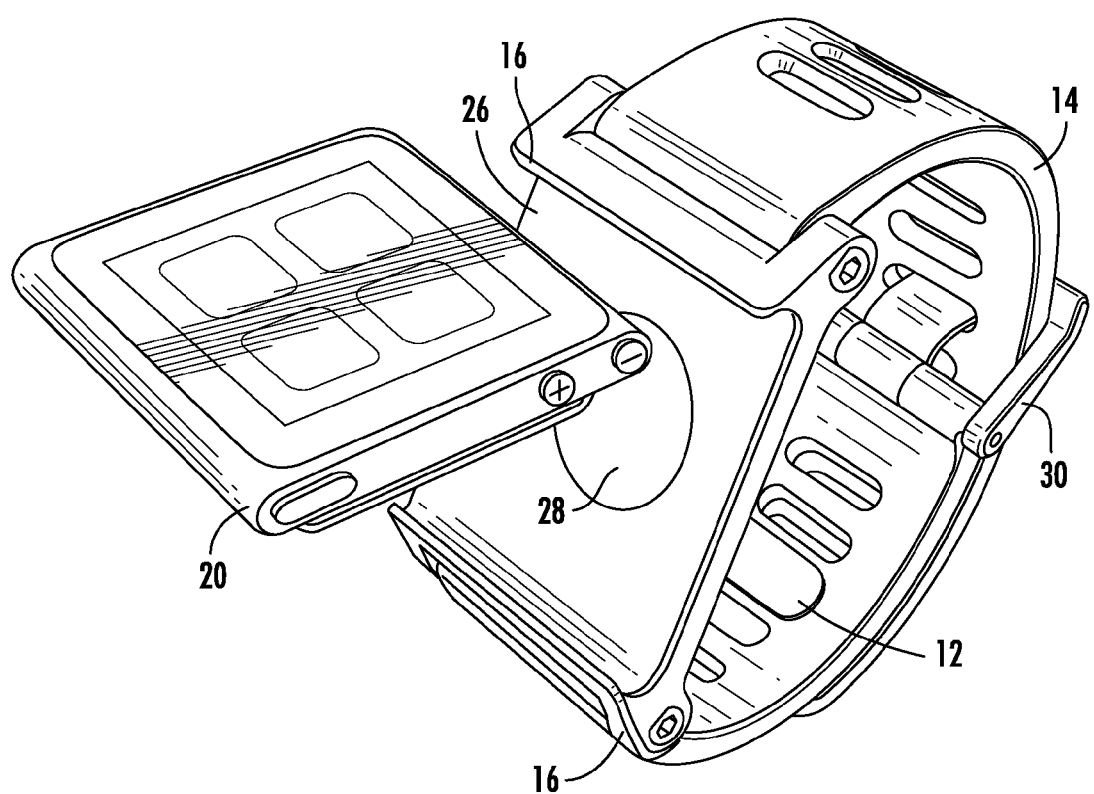
FIG. 4 is a front perspective of the embodiment of FIG. 3 showing the wristband with the electronic device detached.

In the embodiments of FIGS. 3 and 4, the retention member 12 is a simpler component, preferably made from a reinforced polycarbonate material. The retention member 12 is preferably comprised of a recessed area 26 defined by opposing surfaces of the retention member 12 and situated between two somewhat flexible ridges 16. The ridges 16 are contoured so as to engage the top and bottom sides of the electronic device 20, as shown.

Still referring to FIGS. 3 and 4, the device 20 may be inserted into the recessed area 26 of the retention member 12 in one of at least two ways. First, one of either the top or bottom edge of the device 20 is positioned in the recessed area 26 against one of the ridges 16. Then, the opposite end of the device 20 is pivoted down into the recessed area 26 until the edge snaps into place against the other ridge 16. Second, the device 20 can be slid from the side of the retention member 12 under the ridges 16 until it is properly seated in the recessed area 26. Again, the device 20 is frictionally held in place. An opening 28 in a back surface of the recessed area 26 of the retention member 12 allows the user to push the device 20 from the recessed area 26 when it is desired to remove the device 20. The opening 28 may also align with a product logo on the device 20, so as to clearly display the logo when the wristband 10 is not being worn. Otherwise, the two ridges 16 secure and retain the device 20 within the retention member 12.

The strap 14 in two of the disclosed embodiments (FIGS. 1 and 3) is preferably manufactured from a soft, silicone rubber material to provide the proper strength, comfort and look of a sporty or casual watchband. Again, other materials, such as polymers, leathers, metals, synthetic fabrics and the like, as well as alternate colors and styles may be used for different applications and designs. The strap 14 is also preferably a two-piece construction for adjustability, with a clasp 30 for connecting the two parts about a user's wrist. The clasp 30 is preferably made from forged, stainless steel.

The strap 14 of the embodiment of FIG. 5 is a more elegant and traditional watchband look. It is comprised of aluminum links connected together via a butterfly clasp 30. Again, the specific material (e.g., gold, silver, platinum, etc.) and finish of the metal-link band may be altered for different applications and designs. Certainly other styles for strap 14 not specifically mentioned herein are possible.

Referring to FIGS. 8-12, there is illustrated an embodiment of the electronic device holder as a lock and/or clip, which is generally designated by the numeral 110. The lock 110 has a retention member 112 and a generally U-shaped shank 114 which allows attachment of the entire device to, for example, a chain, a locker, a backpack or the like. Much like the watchband embodiments, the retention member 112 retains an electronic device 20, such as an MP3 player, and preferably an Apple® iPod nano (6th generation) as shown, which then allows access to the functionality of the device as, for example, a wristwatch, a radio, a game console or the like. While the Apple® iPod nano is the illustrated electronic device for the disclosed embodiment of FIGS. 8-12, the lock 110 is not limited to use with this device and can also be used with a smartwatch, such as the Apple® Watch. One of skill in the art would recognize that many other electronic devices may be readily adapted for mounting within the disclosed and claimed lock with only slight modifications necessary.

The retention member 112 of the lock 110 is preferably comprised of a two-piece frame 118. Of course, while frames of more complex configurations may be used, the two-piece frame 118 illustrated provides a secure retention of the electronic device 20 with minimal obscuring of the user screen and button controls. The illustrated two-piece frame 118 is preferably forged from aerospace grade aluminum which is machined to a final form on a CNC machine. Of course, other materials and methods may provide suitable results for some applications. The preferred machined frame members have appropriate openings to provide access to both the screen, for viewing and touch-screen interface, and button controls. However, the aluminum components also encase the device 20 sufficiently to provide protection of the same screen and button controls, and protection against accidental detachment of the electronic device 20 as well. The two frame members 118a, 118b can be connected to one another after being placed about the electronic device 20 by two suitable fastening pins 122, as shown.

The U-shaped shank 114, also preferably forged from aerospace grade aluminum, includes a carabineer clip 115 at one end. The two ends of the shank 114 have threaded openings which allow the pins 122 to secure each end of the shank to the retention member 112. However, the design, shape and material of the shank 114 may be changed to suit specific applications.

Figure 8:
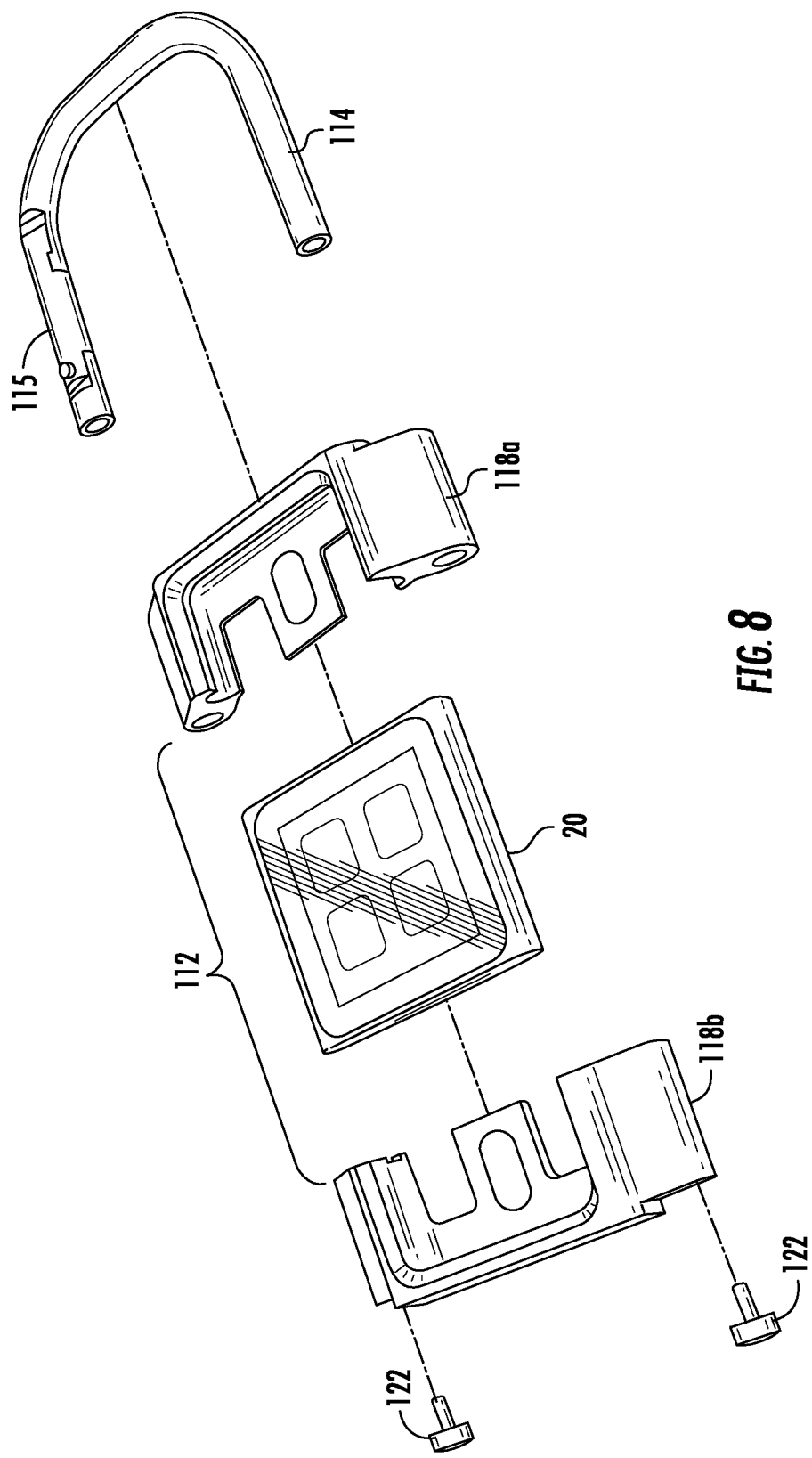
FIGS. 8-12 are various views of a third embodiment of an electronic device holder.
Figure 9:
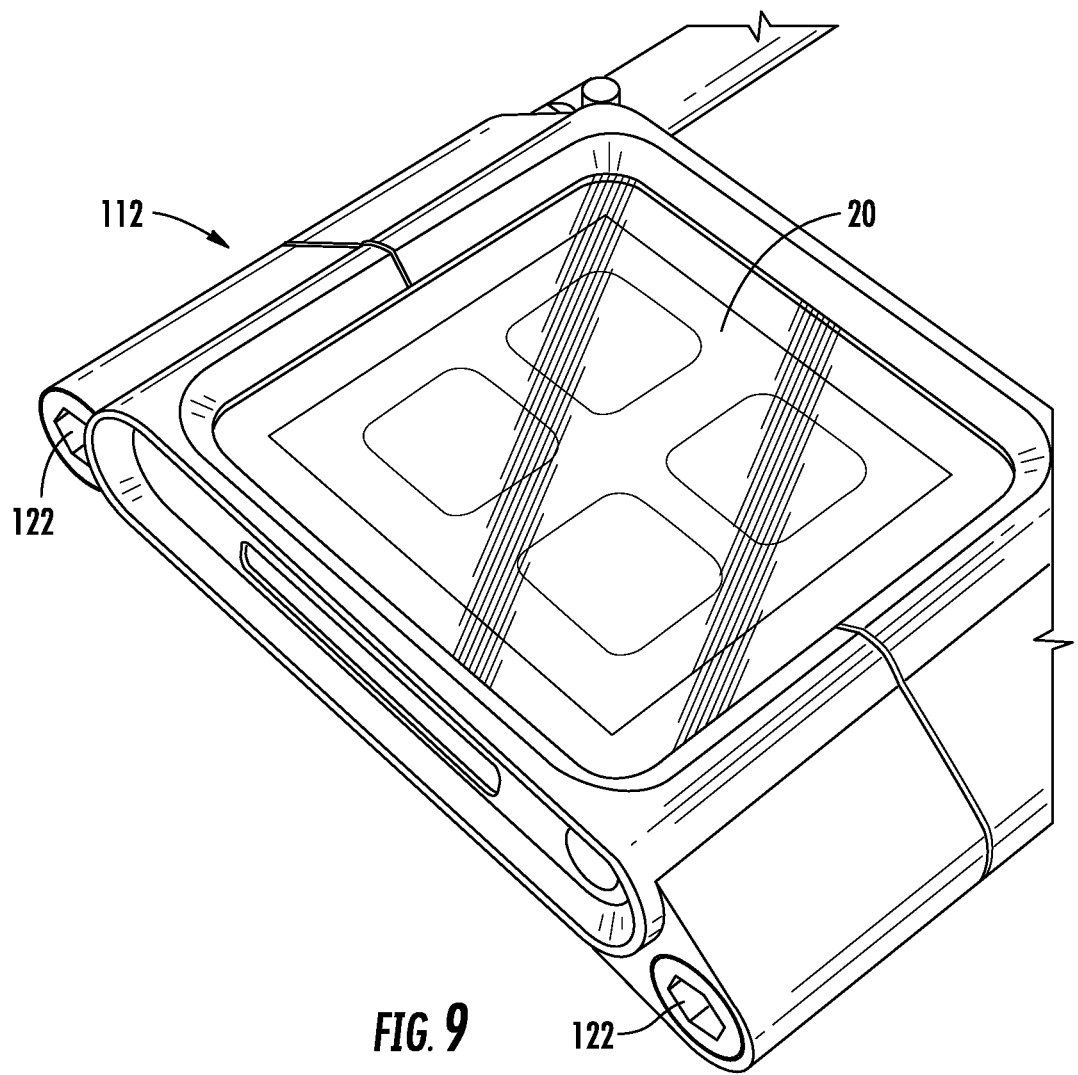
Figure 10:
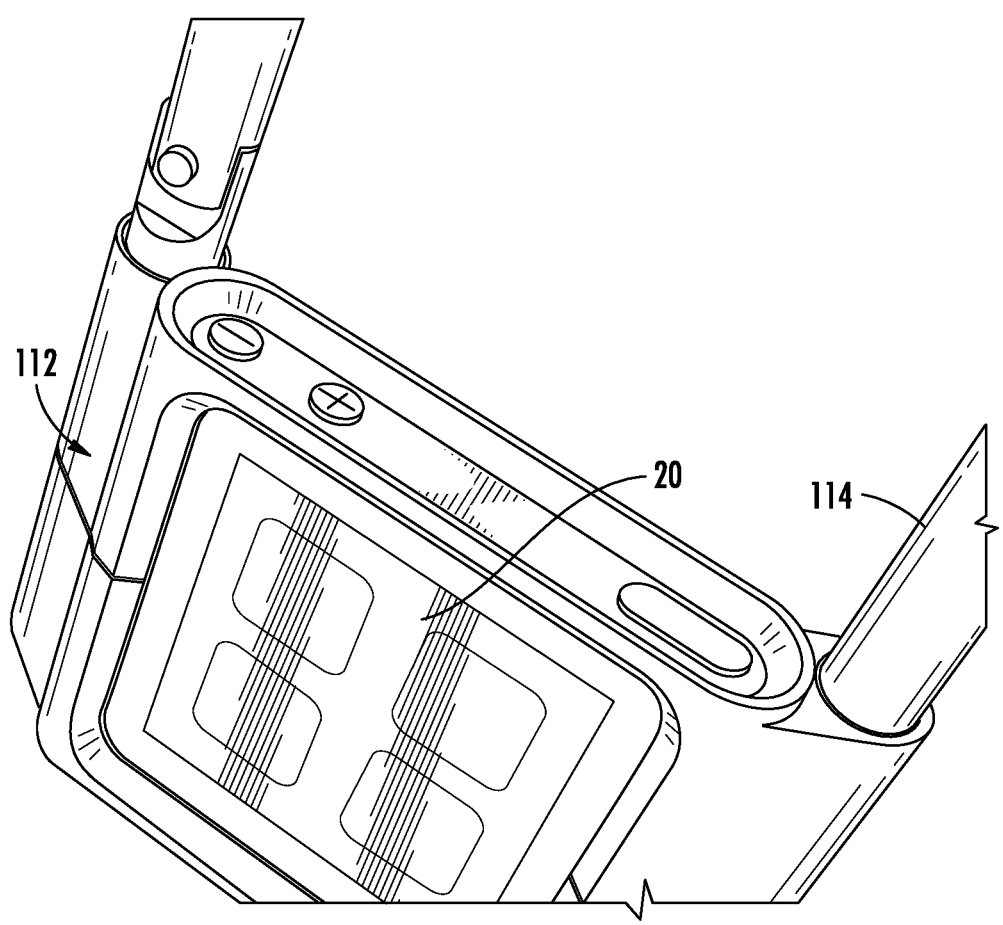
Figure 11:
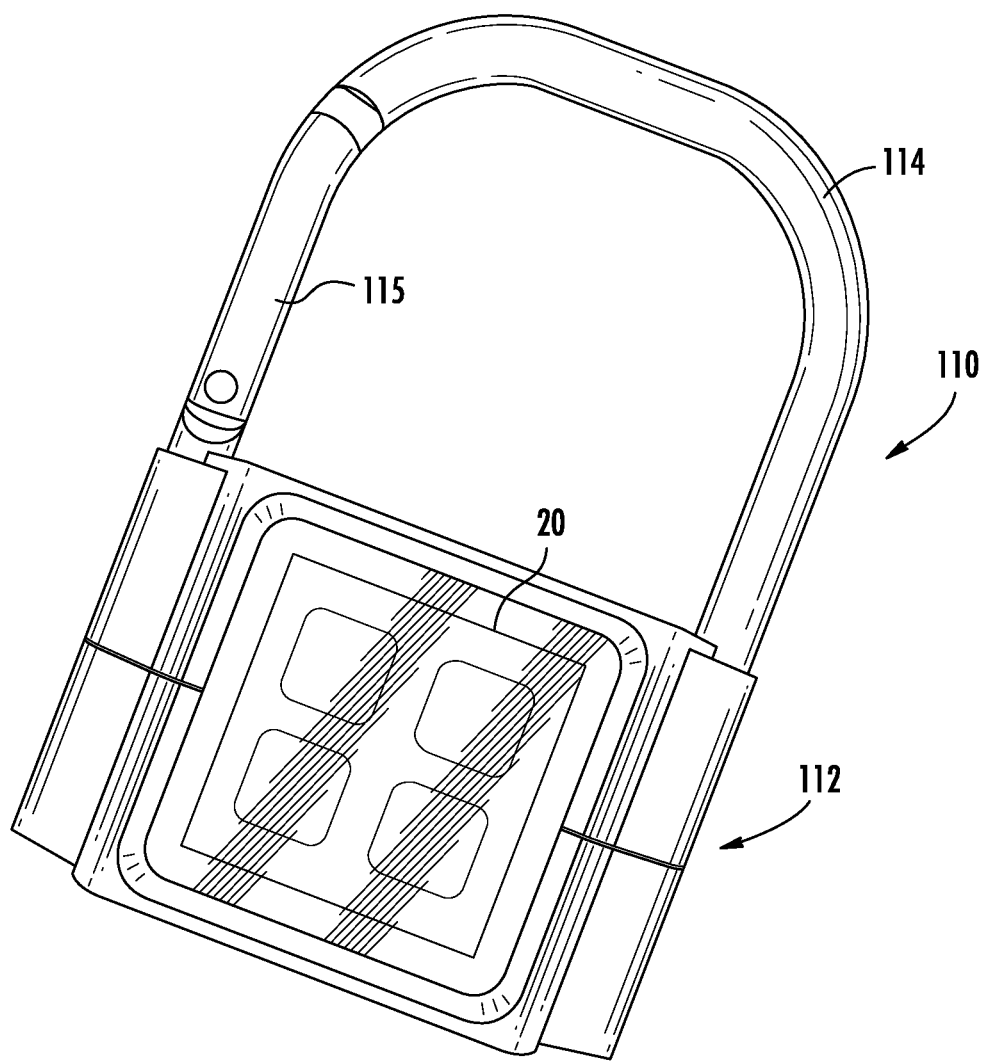
Figure 12:
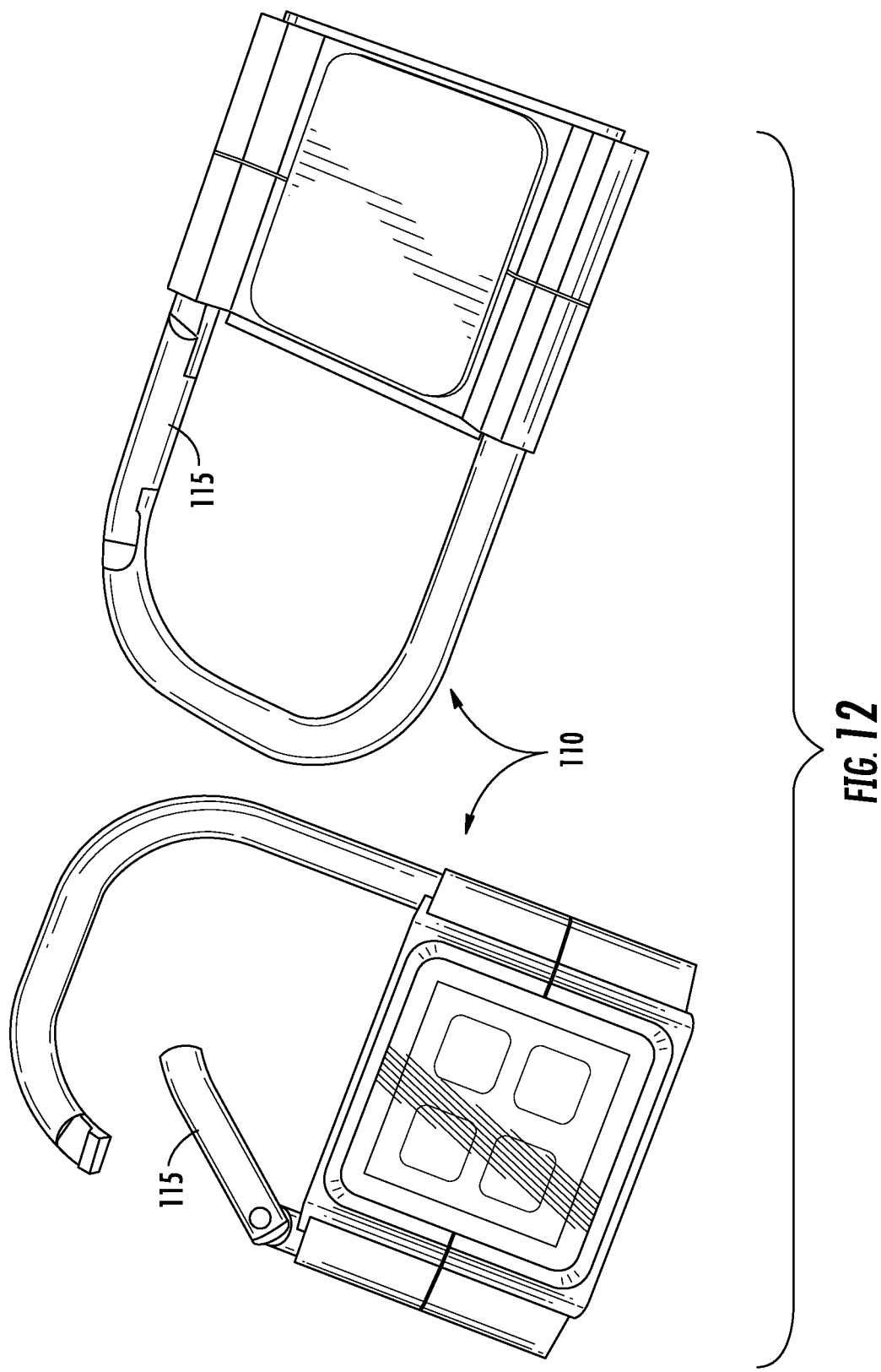

A unique aspect of the two-piece frame 118, as discernible in FIG. 8, is that the two halves are identical. That is, the top half 118a is the same as the bottom half 118b, only rotated 180°. By using two identical pieces, much time and cost is saved in both manufacture and assembly of the retention member 112 in this embodiment. Further, in the event of loss or damage to one side, replacement can be made without having to "orphan" a mating side and without having to replace an undamaged or remaining side. The resulting retention member 112 is symmetrical top-to-bottom, as well as side-to-side.

Referring to FIGS. 13-17, illustrated are embodiments of wearable electronic device casing 210 configured as a wristband. The casing 210 includes a retention member or 212, which retains an electronic device 20, such as a smartwatch (e.g., an Apple® Watch, as shown) or an MP3 player (e.g., an Apple® iPod nano (6th generation)). As explained below, retention member 212 is designed so as to provide a waterproof encasement for electronic device 20. Specifically, while all functional controls of device 20 remain accessible when installed in retention member 212, the member 212 prevents ingress of water into any openings of device 20 under up to 5 atmospheres of pressure, depending on the embodiment. The wearable casing 210 further includes a wrist strap 214 which allows attachment of the electronic device 20 to, preferably, a user's wrist, and provides access to the functionality of the device 20 as, for example, a wristwatch, a radio, a game console or the like. In the case of a smartwatch, which typically includes an electronic device portion and a manufacturer-provided watchband (not shown), the electronic device portion 20 can be removed from the watchband before being placed into the retention member 212.

While the Apple® Watch is the only illustrated electronic device 20 for the disclosed embodiment of FIGS. 13-17, the wearable casing 210 is not limited to use with this device 20. It is anticipated that many other electronic devices may be readily adapted for mounting within the disclosed and claimed wristband with only slight modifications necessary. For example, mobile phones, communication devices, calculators, heart/health monitors, GPS devices, analog/digital watches and countless other electronic gadgets may be configured to be worn within wearable casing 210. Only the retention member 212 need be adapted to the shape and controls of such gadgets. The retention member 212, in different embodiments, may provide one of either a quick and temporary retention of the device 20 or a more permanent retention, as desired by the user.

Figure 13:
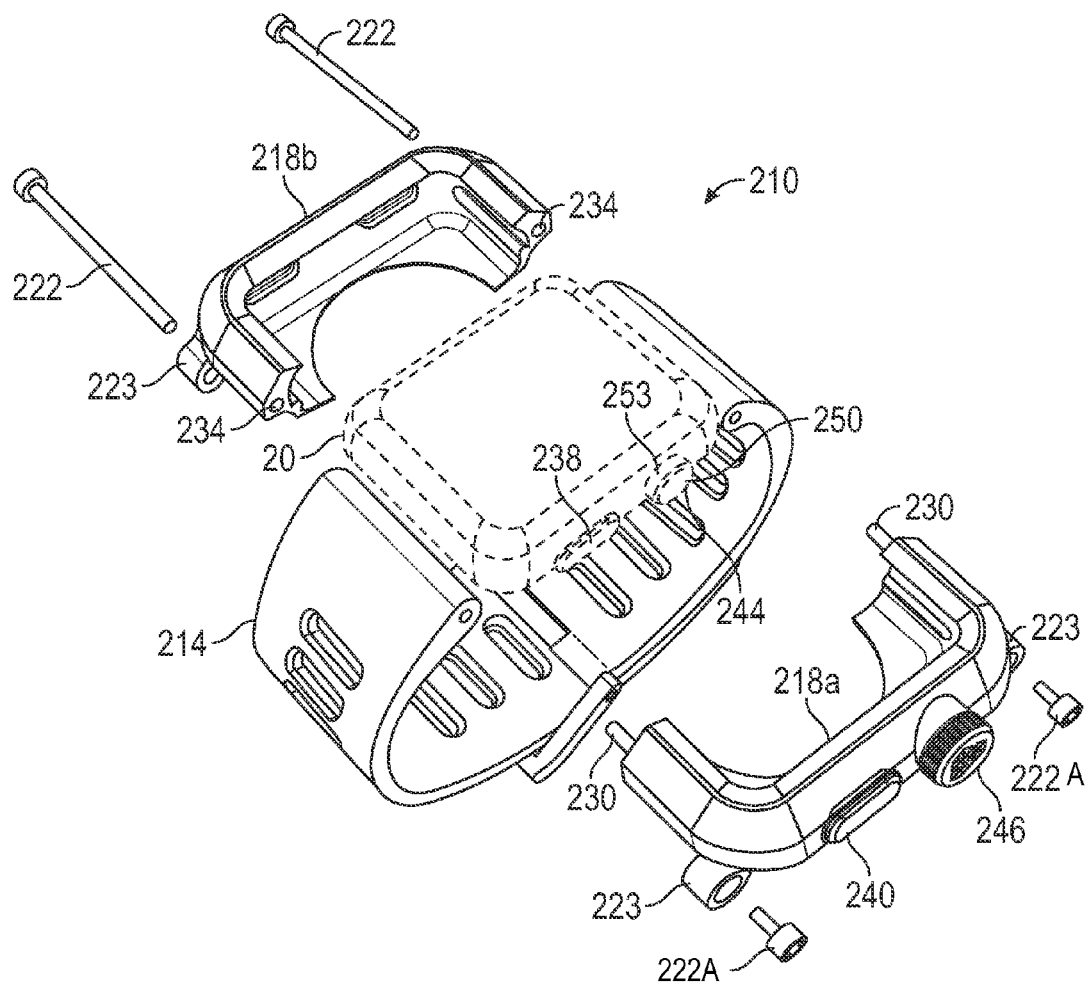
FIG. 13 is a front exploded view of an embodiment of the electronic device holder illustrating the capture and retention of an electronic device.
Figure 14:
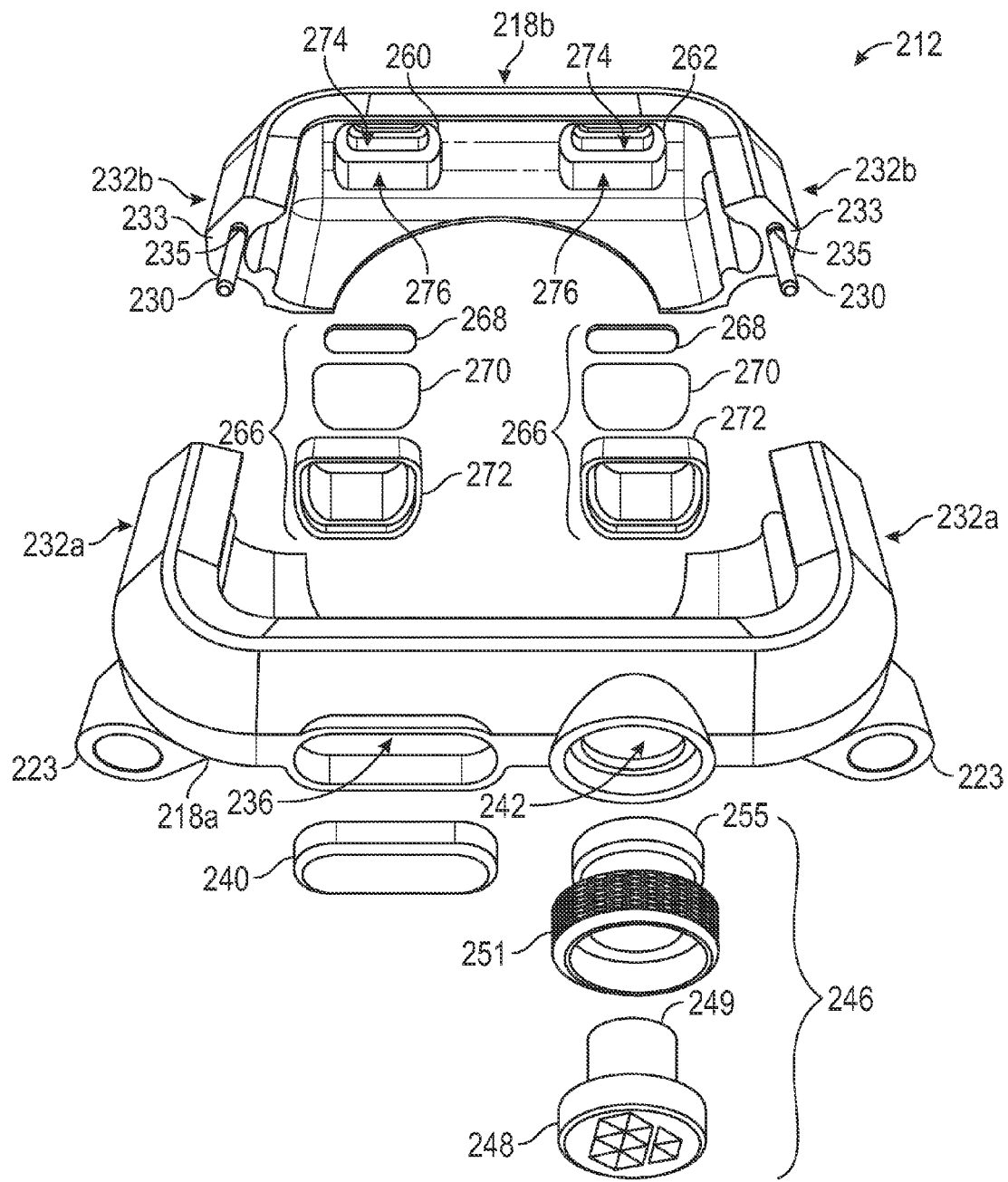
FIG. 14 is a side exploded view of the embodiment of FIG. 13 showing the wristband and electronic device detached.
Figure 15:
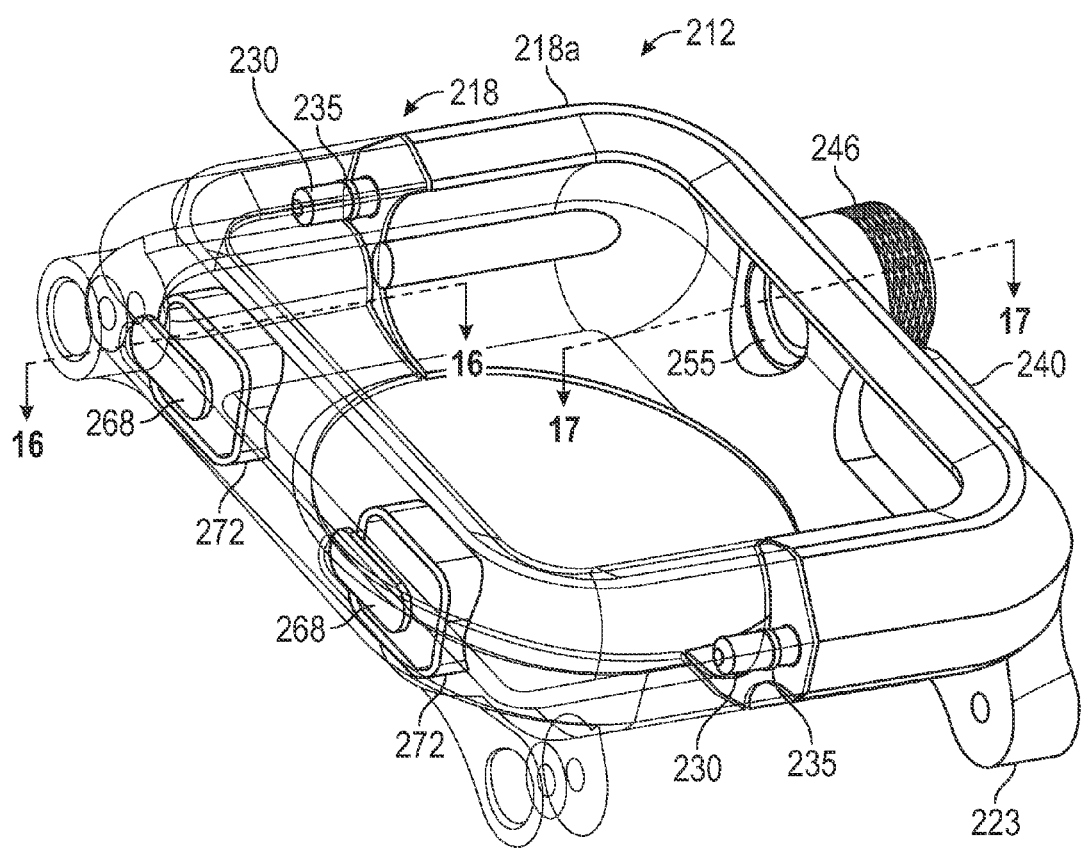
FIG. 15 is a front perspective view of the embodiment of FIG. 14 showing the holder in an assembled state with one half of the holder in phantom.

As shown in FIGS. 13-15, the retention member 212 is preferably comprised of a two-piece frame 218. Of course, while frames of more complex configurations may be used, the illustrated two-piece frame 218 provides a secure retention of the electronic device 20 with minimal obscuring of the user screen and/or button controls. The illustrated two-piece frame 218 is preferably forged from aerospace grade aluminum which is machined to a final form on a CNC machine. Of course, other materials and methods may provide suitable results for some applications. The preferred machined frame members have appropriate openings to provide access to both the screen, for viewing and touch-screen interface, and button controls. However, the aluminum components also encase the device 20 sufficiently to provide protection of the same screen and button controls, and protection against accidental detachment of the electronic device 20 as well.

The frame 218 comprises two frame members 218a and 218b that can be connected to one another by two pairs of suitable fastening pins 222 inserted through corresponding retaining extensions 223 located at the four corners of the retention member 212, as shown, for example, in FIG. 13. Each retaining extension has a through hole for receiving one of the fastening pins. Each fastening pin has a male and female component, such that the male component feeds through the through holes of the retaining extensions (one of each frame member) and joins to the female component. The fastening pins 222 not only connect the two frame members 218a and 218b together, but also pass through apertures at the ends of the strap 214 to attach the strap 214 to the retention member 212. The two frame members 218a and 218b can also be coupled together by a pair of suitable alignment pins 230, as described below.

As shown in FIG. 14, each frame member 218a, 218b includes a pair (top and bottom) of legs 232a, 232b that meet at interfacing surfaces 233 when the frame 218 is assembled, and each of the surfaces 233 can include a pin hole 234 for receiving one end of the corresponding alignment pins 230. The alignment pins 230 can be fastened to the holes 234 in either of the frame members 218a and 218b using a friction fit or other suitable fastening means. For example, FIG. 13 shows the alignment pins 230 coupled to the frame member 218a, ready for insertion into the pin holes 234 in the frame member 218b, while FIG. 14 shows the alignment pins 230 coupled to the frame 218b and ready for connection to the frame member 218a. As shown in FIG. 15, each of the alignment pins 230 can include a mechanical gasket 235, such as an o-ring, to seal any gaps at the pin holes 234 between the interfacing surfaces 233, from water-seepage and other damaging environmental elements. The alignment pins 230 can be made of a suitable metal or sturdy plastic, preferably stainless steel, and the gaskets 235 can be made of an elastomer, preferably rubber.

The strap 214 is preferably manufactured from a soft, silicone rubber material to provide the proper strength, comfort and look of a sporty or casual watchband. Certainly other styles for strap 214 not specifically mentioned herein are possible. Also, other materials, such as polymers, leathers, metals, synthetic fabrics and the like, as well as alternate colors and styles may be used for different applications and designs. The strap 214 is preferably a two-piece construction for adjustability, with a clasp (e.g., as shown in FIG. 1) for connecting the two parts about a user's wrist. The clasp is preferably made from forged, stainless steel, though other materials (e.g., gold, platinum, etc.) are also possible.

The retention member 212 can include a number of openings within the frame 218 to provide access to one or more buttons, dials, and/or ports of the electronic device 20. In embodiments, the frame member 218a can include a first opening 236 that receives a first button 238 of the electronic device 20 therein and an accompanying first cover 240 that provides access to the first button 238 when the electronic device 20 is placed within the wearable casing 210. An outer portion of the first cover 240 can have a shape and/or structure that is substantially similar to that of the first button 238, such as an ovoid structure as shown in FIG. 13. An inner portion of the first cover 240 can extend through the first opening 236 towards the electronic device 20, so that the first cover 240 is in contact with, or flush against, the first button 238 within the frame member 218a.

As also illustrated, the frame member 218a can include a second opening 242 that receives a second button 244 of the electronic device 20 therein and an accompanying second cover 246 that provides access to the second button 244 when the electronic device 20 is placed within the wearable casing 210. An outer portion of the second cover 246 can have a shape and/or structure that is substantially similar to that of the second button 244, such as a cylindrical or knob structure as shown in FIG. 13. An inner portion of the second cover 246 can extend through the second opening 242 towards the electronic device 20, so that the second cover 246 is in contact with, or flush against, the second button 244 within the frame member 218a.

In embodiments, the second cover 246 and/or the second opening 242 can include a plurality of components to enable access to various features or functionalities of the second button 244, including dual-action features. The second cover 246 can include a push button 248 that is configured for lateral movement relative to the second opening 242 and the second button 244. Pressing the push button 248 can cause a central surface 249 (also referred to herein as "push interface") of the push button 248 to press against a central or push portion 250 of the second button 244, thereby activating any push or press functionality of the second button 244.

The second cover 246 can also include a turn dial 251 that is configured for rotational movement relative to the second opening 242 and the second button 244. The turn dial 251 can include a dial surface 252 (also referred to herein as "turn interface") that surrounds an outer edge of, or creates a ring around, the central surface 249 of second button 244. When the electronic device 20 is placed within the frame 218, the dial surface 252 can be adjacent to and/or in contact with an outer or turn portion 253 of the second button 244. Rotating the turn dial 251 can cause the dial surface 252 to rotate or turn the outer portion 253 of the second button 244, thereby activating any dial-like functionality of the second button 244.

Figure 17:
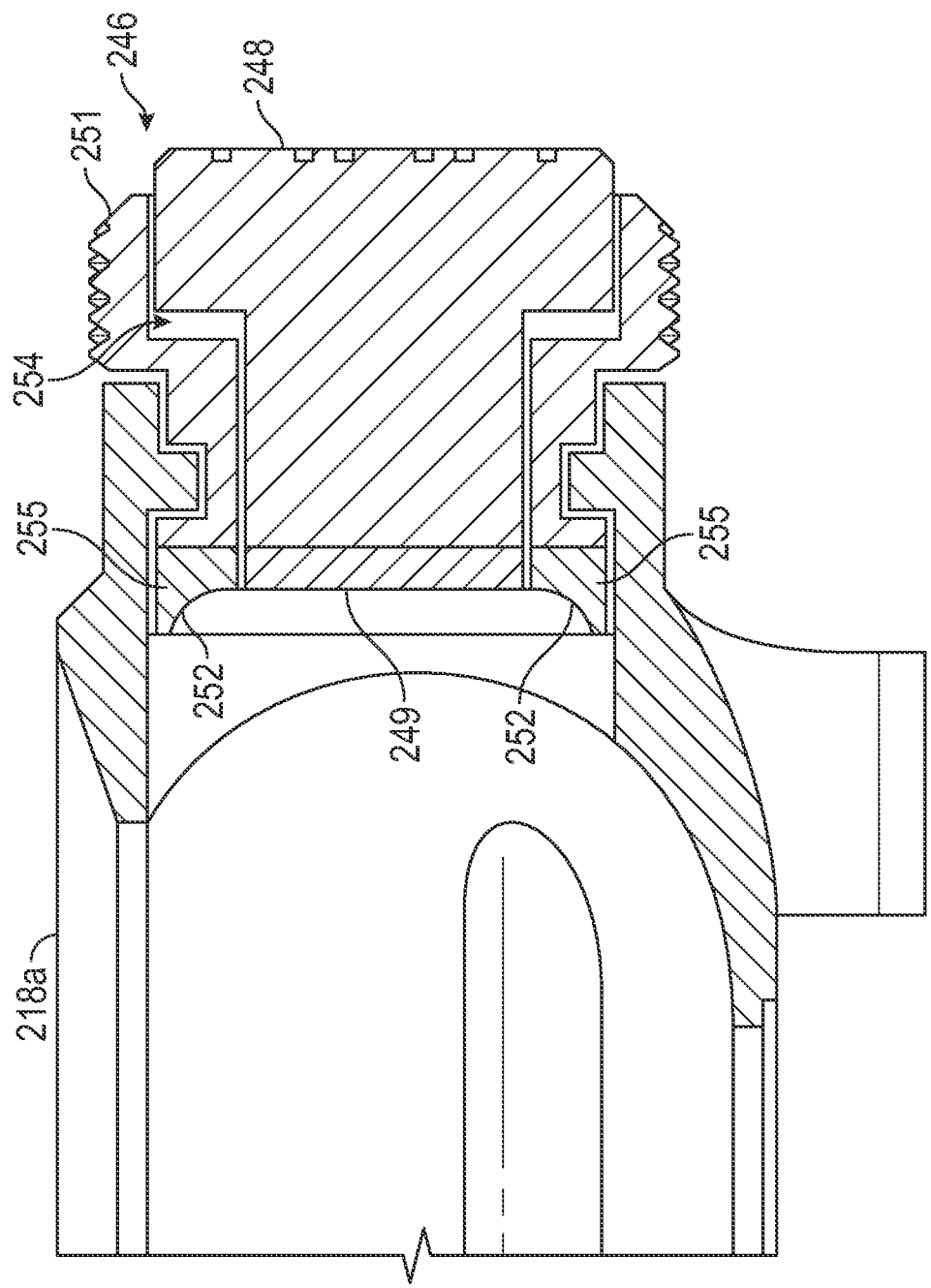

As shown in FIG. 17, the push button 248 can be positioned within a central cavity of the turn dial 251 such that a gap 254 is formed between the two and the push button 248 essentially floats within the turn dial 251, which serves as a cage to retain the push button. The gap 254 allows lateral movement of the push button 248 without touching or causing movement of the turn dial 251, and enables the turn dial 251 to rotate without touching or causing movement of the push button 248, thereby preserving any dual-action functionality of the second button 244.

In the illustrated embodiment, the turn dial 251 has a textured surface to enable slip-free gripping of the dial 251 by the user during rotation. In embodiments, the second button 244 can also have textured, slip-free gripping features on the outer portion 253 of the button 244, and the second cover 246 can be configured to grasp said textured portions of the second button 244. For example, as shown in FIG. 17, the second cover 246 can include a non-slip gasket 255 that is molded to fit over or around the second button 244 and create a friction fit therewith. The non-slip gasket 255 can be made of rubber or other suitable material that can grip, or stick to, the second button 244 to ensure that the second cover 246 stays secured to or pressed against the second button 244 during rotation of the turn dial 251. In some embodiments, the non-slip gasket 255 forms the dial surface 252 of the turn dial 251 and/or the central surface 249 of the push button 248. In some embodiments, the non-slip gasket 255 and/or the push button 248 and turn dial 251 can include a light adhesive coating to keep the second cover 246 secured to the second button 244, particularly during rotation of the turn dial 251 and the press and release movements of the push button 248. The rubber gasket 255 can also be configured to secure the second opening 242 and help prevent water-seepage and/or infiltration of other environmental elements.

As shown in FIG. 14, the retention member 212 can also include a third opening 260 and/or a fourth opening 262 for accommodating one or more ports (not shown) in the electronic device 20. The openings 260, 262 can be configured according to a shape, size, number, and placement of corresponding ports in the electronic device 20. In the illustrated embodiment, the openings 260 and 262 correspond to two audio ports (not shown) on a side of the electronic device 20 opposite the buttons 240 and 244, the audio ports including at least one of a speaker port or a microphone port. In other cases, the openings 260, 262 can correspond to a sensor port, a charging port, a data port, and/or any other component of the electronic device 20 that requires access thereto after placement within the retention member 212. Further, while the openings 260, 262 are substantially identical in the illustrated embodiment, in other embodiments each of the openings 260, 262 can have a different shape, size, placement, and/or function to accommodate the ports of the electronic device 20.

Figure 16:
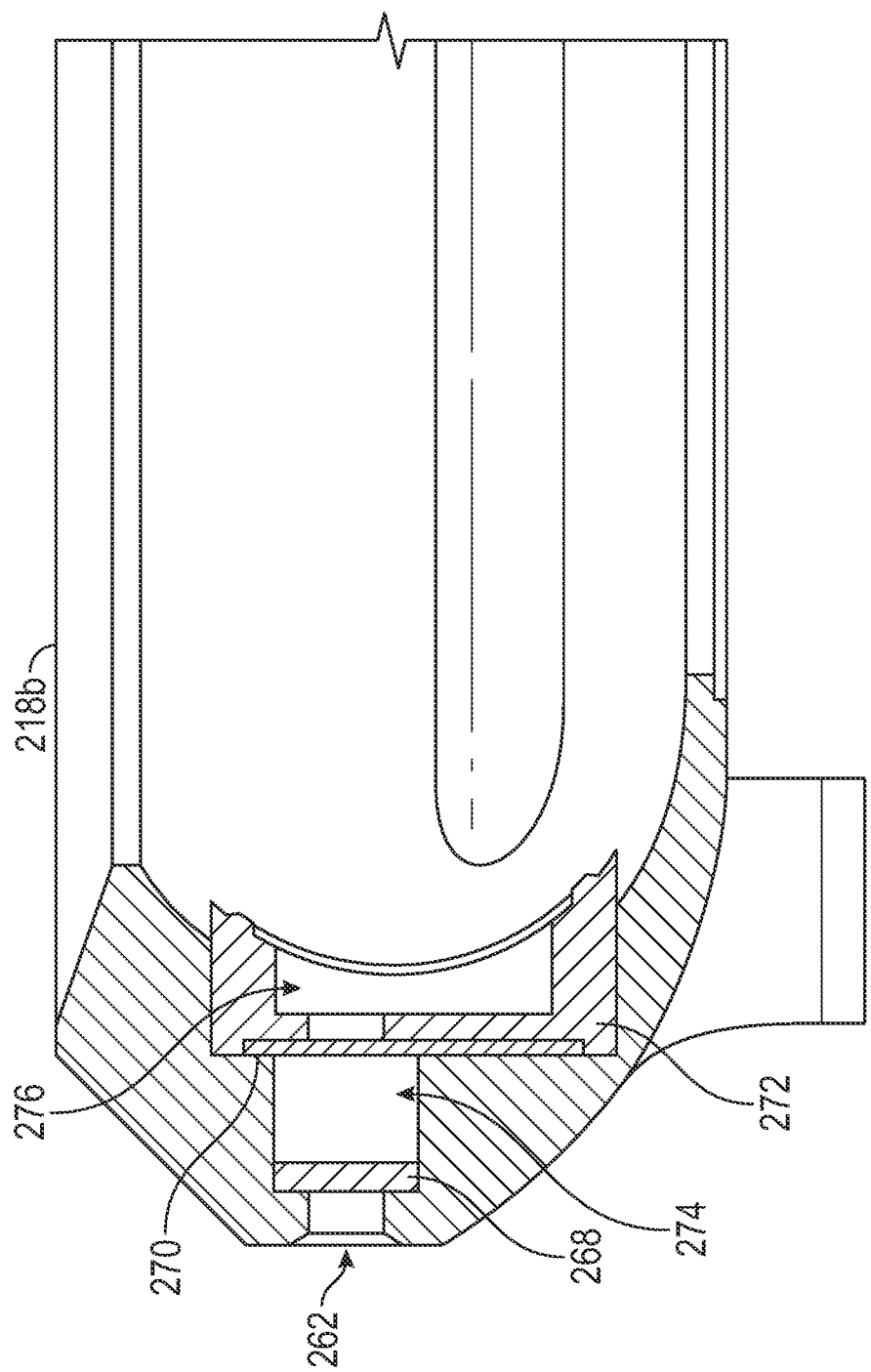
FIGS. 16 and 17 are partial cross-sectional views of the embodiment of FIG. 15.

As shown in FIGS. 14 and 16, each the openings 260, 262 can include a set of adjoining cavities that are stacked together to receive a series of inserts 266 for protecting the openings 260, 262 from water seepage and other environmental elements. For example, the inserts 266 can include a combination of sound permeable speaker covers and waterproof gaskets for sealing the speaker and/or microphone ports of the electronic device 20. The inserts 266 can be made of plastic, rubber, metal, and/or any other suitable material. In some cases, one or more of the inserts 266 can be laminated to create a waterproof seal.

As illustrated, each set of inserts 266 can include one or more of an external layer 268, a middle layer 270, or an internal layer 272. In embodiments, the external layer 268 can be a grated covering (e.g., speaker grill) or any other sound-permeable, water-impermeable piece that is configured for placement into a first cavity 274 of at least one of the openings 260, 262. As shown, the first cavity 274 provides access to an outside of the retention member 212 for audio transmission. The internal layer 272 can be a boot or plug-like gasket that fits or compresses into a second cavity 276 of at least one of the openings 260, 262 to create a waterproof seal. As shown, the second cavity 276 is sandwiched between the first cavity 274 and an internal space formed by the retention member 212 when assembled around the electronic device 20. In embodiments, the internal layer 272 can be adjacent to, or flush against, the electronic device 20 when placed into the wearable electronic device casing 210.

The middle layer 270 can be a substantially flat shield or film layer (preferably, sound permeable but not water permeable) that is optionally placed between the internal layer 272 and the external layer 268 for added protection and/or improved sound quality. For example, FIGS. 14 and 16 show the middle layer 270 in between the internal layer 272 and the external layer 268, while FIG. 15 shows no middle layer between the layers 268 and 272. In the illustrated embodiment, the middle layer 270 can be placed against or within a window of the internal layer 272 such that the middle layer 270 acts as a seal between the first cavity 274 and the second cavity 276. In some cases, the openings 260, 262 can further include a middle cavity (not shown) that is configured to receive the middle layer 270 between the first cavity 274 and the second cavity 276, before placement of the internal layer 272 into the second cavity 276.

In embodiments, the frame members 218a and 218b can be configured to cover, or couple to, any two opposing sides of the electronic device. In the illustrated embodiments, the frame members 218a and 218b are configured to fit over the opposing left and right sides of the electronic device 20 and join at a vertical axis running down the electronic device 20. In other embodiments (not shown), the frame members 218a and 218b can be configured to fit over the opposing top and bottom sides of the electronic device 20 and join at a horizontal axis running across the electronic device 20. In such embodiments, each frame member 218a, 218b can include a different combination of the openings and control covers disclosed herein for providing access to the buttons, dials, and/or ports of the electronic device 20. For example, the frame member 218a may be configured to couple to a top portion of the electronic device 20 and may include the second cover 246 and the second opening 242 on one leg and the opening 262 on the other leg. Likewise, the frame member 218b may be configured to couple to a bottom portion of the electronic device 20 and may include the first cover 240 and the first opening 236 on one leg and the opening 260 on the other leg.

Certainly other configurations for the frame 218 of the retention member 214 are also possible in accordance with the principles and teachings herein. For example, in some instances, all of the openings and casings of the frame 218 may be included in one large frame member 218a that covers at least three sides of the electronic device 20, and the frame member 218b can be configured to cover the fourth side of the electronic device 20. In such instances, the device 20 can be inserted into the frame 218 between the two legs of the frame member 218a and held in place by securing the frame member 218b to the frame member 218a.

FIGS. 18-23, illustrate another two embodiments of wearable device assemblies that include a casing that is generally designated by the numerals 300, 400. As with the embodiments described above, the casing 300, 400 retains an electronic device, such as a smartwatch (e.g., an Apple® Watch) or an MP3 player (e.g., an Apple® iPod nano (6th generation)). The wearable device assemblies further include a wrist strap 14 which allows attachment of the electronic device to, preferably, a user's wrist, and provides access to the functionality of the device as, for example, a wristwatch, a radio, a game console or the like. In the case of a smartwatch, which typically includes an electronic device portion and a manufacturer-provided watchband (not shown), the electronic device portion can be removed from the watchband before being placed into the casing 300, 400.

In both of these embodiments, the casing 300, 400 is comprised of a two-piece frame including a front frame member 310, 410 and a rear frame member 320, 420 that fit together to form a cavity 301, 401 for an electronic device (not shown). Of course, while frames of more complex configurations may be used, the two-piece frames illustrated provide a secure retention of the electronic device with minimal obscuring of the user screen and button controls. The illustrated two-piece frames are preferably forged from aerospace grade aluminum which is machined to a final form on a CNC machine. Of course, other materials and methods may provide suitable results for some applications. The preferred machined frame members have appropriate openings to provide access to both the screen, for viewing and touch-screen interface, and button controls. However, the aluminum components also encase the device sufficiently to provide protection of the same screen and button controls, and protection against accidental detachment of the electronic device.

Figure 18:
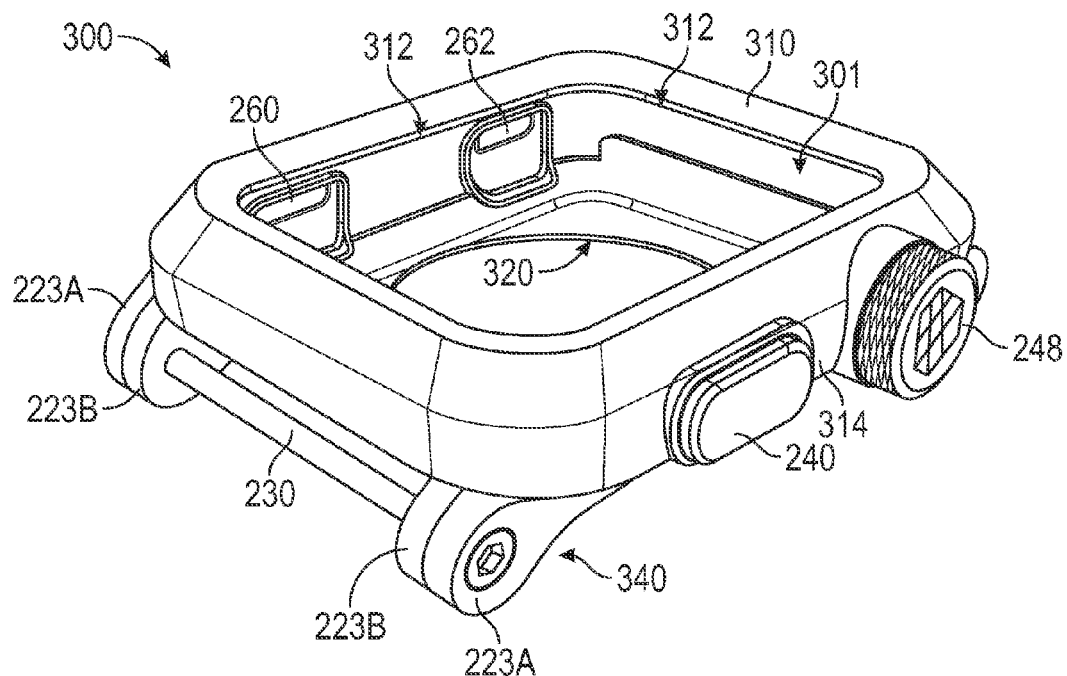
FIG. 18 is a top isometric view of an embodiment of an electronic device casing.
Figure 19:
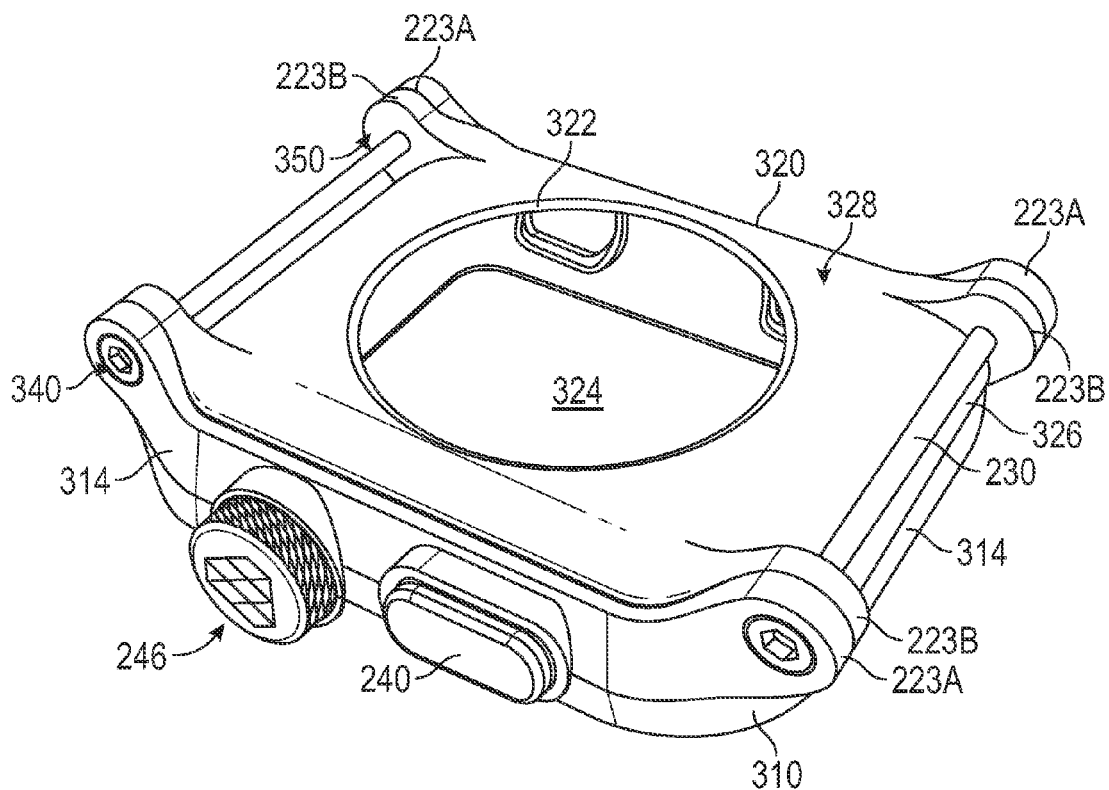
FIG. 19 is a bottom isometric view of the electronic device casing shown in FIG. 18.
Figure 20:
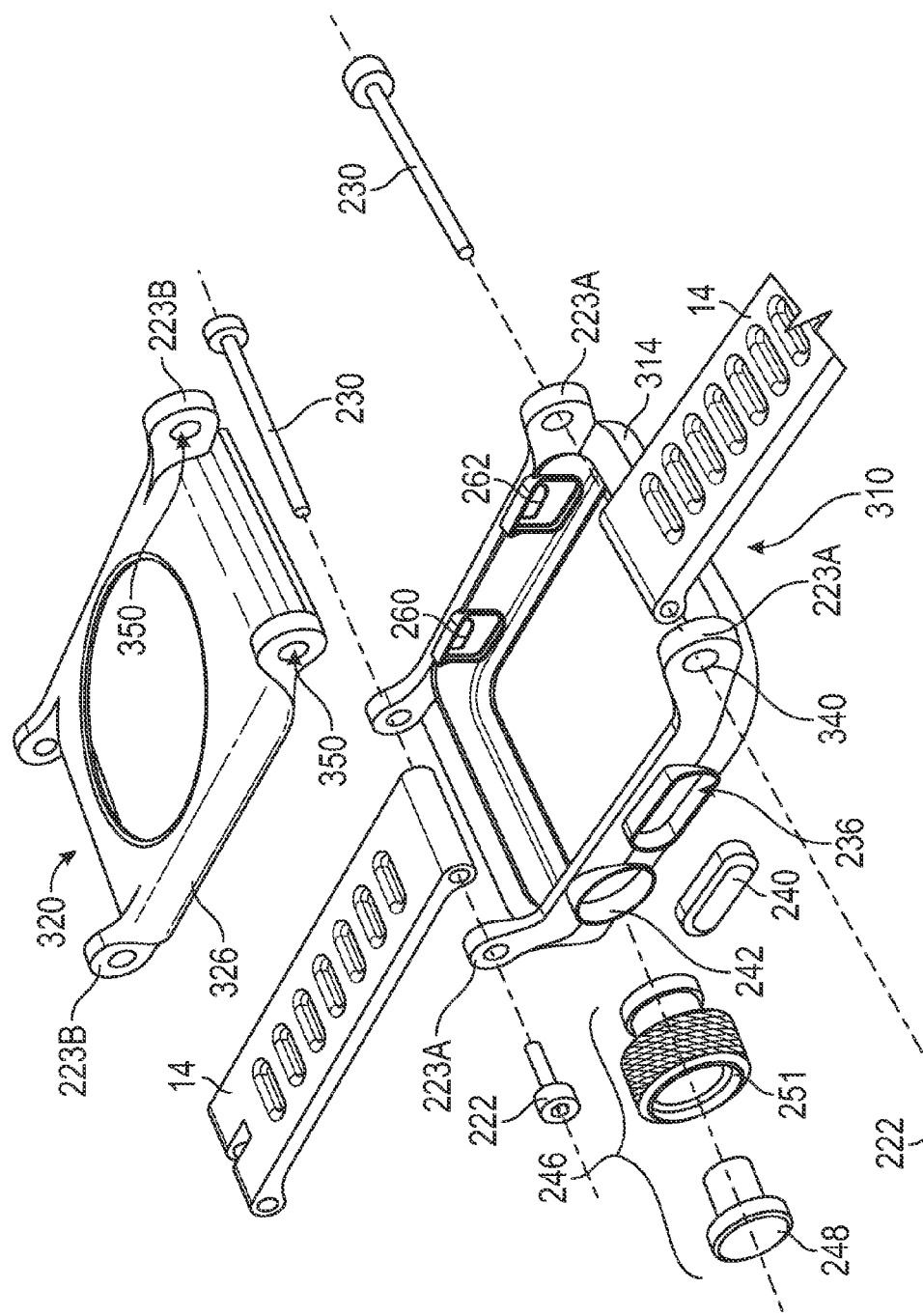
FIG. 20 is an exploded view of the electronic device casing, taken from the isometric angle of FIG. 19.

Turning to FIGS. 18-20, in this embodiment, the casing 300 includes front frame member 310 and rear frame member 320. Front frame member 310 provides sidewalls 314 that extend around the perimeter of the cavity 301. Rear frame member 320 similarly provides sidewalls 326 that extend around the perimeter of the cavity 301. Sidewalls 314 of front frame member 310 join with and cooperate with sidewalls 326 of rear frame member 320 to form the sidewall of the casing 300.

Sidewall 314 of the front frame member 310 further provides overlapping lips 312 that extend perpendicular to the sidewalls 314 and inward from the sidewalls 314 toward the center of the cavity 301. The lips 312 secure the device within the cavity without obscuring the user screen of the electronic device. The front frame member 310 may also comprise an integral or removable membrane, such as a glass or plastic scratch-resistant or water-proof sheet that extends underneath the lips 312, and across the opening of the cavity 301 formed by the sidewalls 314.

As illustrated in FIG. 20, the front frame member 310 further provides a pair of front frame retaining extensions 223A extending along two parallel sides of the casing 300. In similar fashion, the rear frame member 320 provides two pairs of rear frame retaining extensions 223B that extend along the same two parallel sides of the casing. The front frame retaining extensions 223A of the front frame member 310 extend away from the sidewalls 314 of the front frame member 310, towards the rear frame member 320 such that when the front and rear frame members 310, 320 join together about the electronic device, each of the four rear frame retaining extensions 223B joins on the inside of each of the four front frame retaining extension 223A.

Each front frame retaining extension 223A has an eyelet 340 comprising through hole for receiving a fastening pin 222. Similarly, each rear frame retaining extension 223B has an eyelet 350 comprising a through hole that aligns with the holes in eyelets 340 of the front frame member 310. The eyelets 350 of the rear frame member 320 line up with the eyelets 340 of the front frame member 310, and the eyelets 340, 350 of the combined retaining extensions 223 form two sets of aligned eyelets on two parallel sides of the casing 300. The through holes in the combined retaining extensions 223 from one corner are parallel to and aligned with the opening in a second eyelet in another corner. Across the casing on the other side, the other two eyelets are also positioned such that their respective holes are aligned.

As illustrated, an alignment pin 230 inserted through the aligned holes on either side of the casing 300 secure the front and rear frame members 310 and 320 together. The alignment pins 230 not only connect the two frame members 310 and 320 together, but also pass through apertures at the ends of the strap 14 to attach these to the casing 300 as well. Then fastening pins 222 are screwed into alignment pins 230 to draw the structure together and seal it.

As illustrated in FIG. 19, the rear frame member 320 includes a rear surface 328. In one embodiment, the rear surface 328 includes an opening 324 with a perimeter 322 around the opening 324. The rear surface 328 extends from the perimeter 322 outward and eventually turns perpendicular to form sidewalls 326. The opening 324 allows the user to push the device from the cavity 301 when it is desired to remove the device. The opening 324 may also align with a product logo on the device, so as to clearly display the logo when the wristband is not being worn. In another embodiment, the electronic device could be, for example, an APPLE WATCH, that has electrodes in this area to sense a human pulse when worn. Opening 324 accommodates this feature. In certain embodiments, a seal (not shown) could be provided around a track on the inside of the perimeter 322 to ensure against water ingress.

Figure 21:
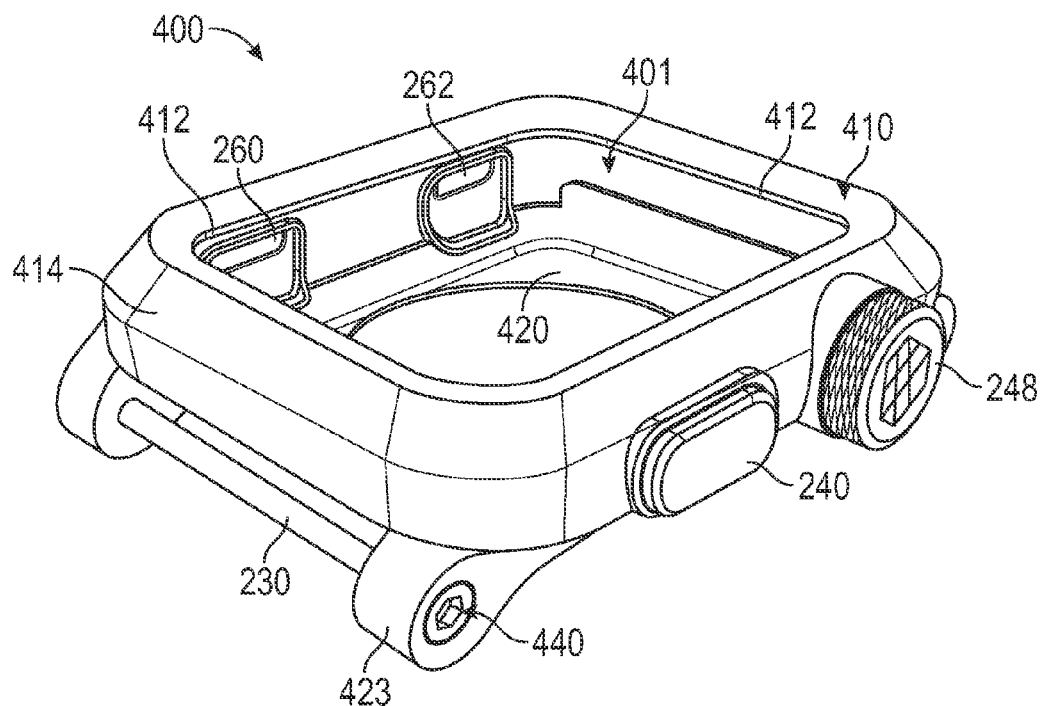
FIG. 21 is a top isometric view of an embodiment of an electronic device casing.
Figure 22:
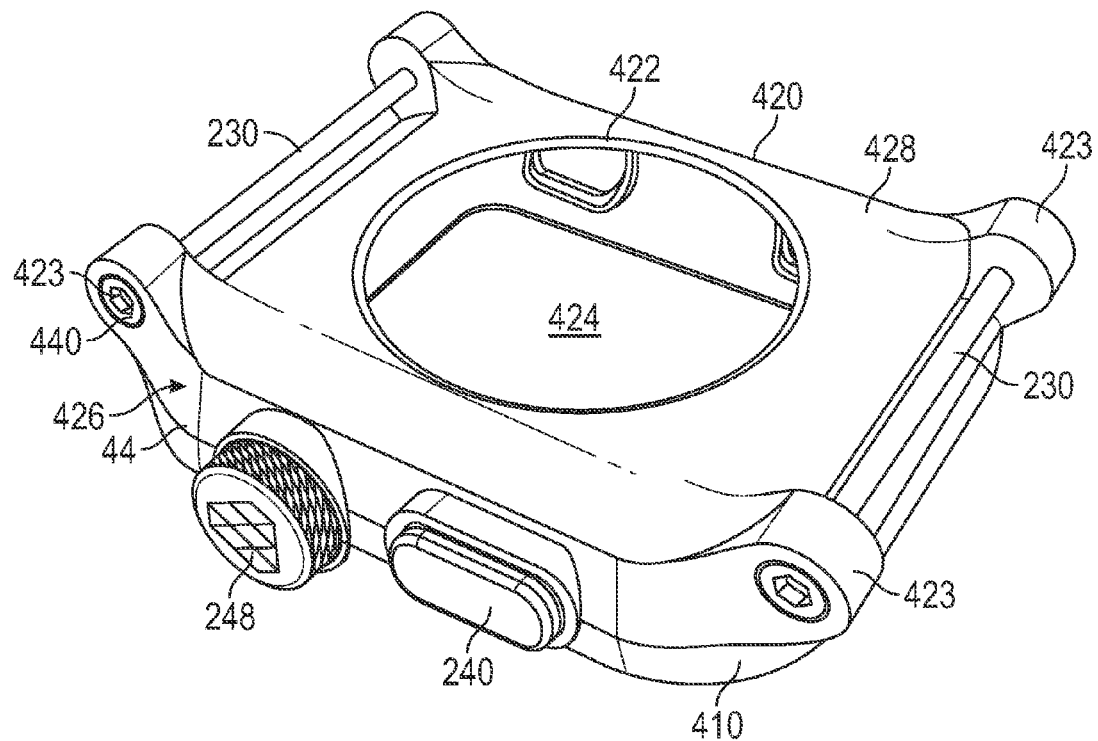
FIG. 22 is a bottom isometric view of the electronic device casing shown in FIG. 21.
Figure 23:
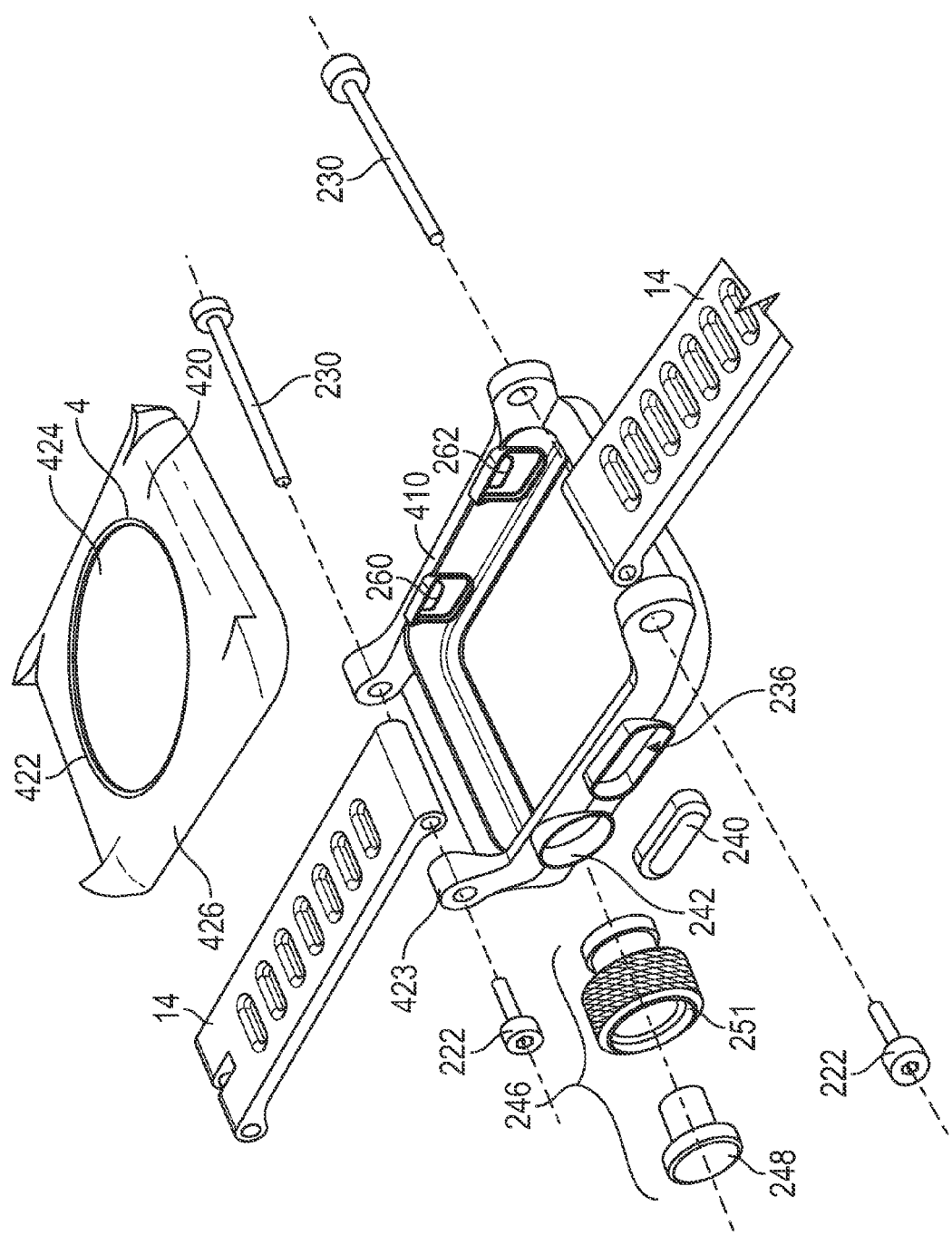
FIG. 23 is an exploded view of the electronic device casing, taken from the isometric angle of FIG. 21.

FIGS. 21-23 depict another embodiment of a wearable device assembly that includes casing 400 having a front frame member 410 and a rear frame member 320. In this embodiment, casing 400 has a similar geometry to casing 300 depicted in FIGS. 18-20, however, the rear frame member 420 of casing 400 has no retaining extensions or eyelets. The rear frame member 420 snaps or presses into the front frame member 410 in a removable configuration to form the full housing around the electronic device, with the strap 14 for wearing the assembly retained only by the front frame member 410.

Turning to FIGS. 21-23, in this embodiment, much like the embodiment described above with respect to FIGS. 18-20, the front frame member 410 of casing 400 provides sidewalls 414 that extend around the perimeter of the cavity 401. Rear frame member 420 similarly provides sidewalls 426 that extend around the perimeter of the cavity 401. Sidewalls 414 of front frame member 410 join with and cooperate with sidewalls 426 of rear frame member 420 to form the sidewall of the casing 400.

Sidewall 414 of the front frame member 410 further provides overlapping lips 412 for securing the device within the cavity 401. Lips 412 extend perpendicular to the sidewalls 414 and inward from the sidewalls 414 toward the center of the cavity 301. As described above, the front frame member 410 may also comprise an integral or removable membrane, such as a glass or plastic scratch-resistant or water-proof sheet that extends underneath the lips 412, and across the opening of the cavity 401 formed by the sidewalls 414.

The rear frame member 420 has no retaining extensions or eyelets in this embodiment. Rather all of the eyelets are all formed in the front frame member 410 exclusively. More specifically, the front frame member 410 provides a pair of retaining extensions 423 extending along two parallel sides of the casing 400. The retaining extensions 423 of the front frame member 410 extend away from sidewalls 414 of the front frame member 410, towards the rear frame member 420. Each retaining extension 423 of the front frame has an eyelet 440 comprising through holes for receiving a fastening pin 222. The eyelets 440 of the retaining extensions 423 form two sets of aligned eyelets on two parallel sides of the casing 400. The through holes in the retaining extensions 423 from one corner is parallel to and aligned with the opening in a second eyelet in another corner. Across the casing on the other side, the other two eyelets are also positioned such that their respective holes are aligned. An alignment pin 430 passes through the eyelets 440 of the front frame and connect to fastening pin 222 only for the purpose of retaining the straps 14.

Frame members 410 and 420 could join along a ridge or could use overlapping inserts to fit together and seal. For removal, a user could simply press firmly on the face of the electronic device (assuming the casing is not equipped with a front membrane over the device) to release the rear frame member 420 from the front frame member 410. If there is such a membrane, an access point could be provided so as to insert a fingernail or tool to pry the two frames apart.

As illustrated in FIG. 21, the rear frame member 420 includes a rear surface 428. In one embodiment, the rear surface 428 includes an opening 424 with a perimeter 422 around the opening 424. The rear surface 428 extends from the perimeter 422 outward and eventually turns perpendicular to form sidewalls 326. The opening 424 allows the user to push the device from the cavity 401 when it is desired to remove the device. The opening 424 may also align with a product logo on the device, so as to clearly display the logo when the wristband is not being worn. In another embodiment, the electronic device could be, for example, an APPLE WATCH, that has electrodes in this area to sense a human pulse when worn. Opening 424 accommodates this feature. In certain embodiments, a seal (not shown) could be provided around a track on the inside of the perimeter 422 to ensure against water ingress.

For both casing 300 and 400, in certain embodiments, the front frame member 310, 410 further provide openings for access to one or more buttons, dials, and/or ports of the electronic device. As described in greater detail with respect to FIGS. 13-14, in certain embodiments, the front frame member 310, 410 can include a first opening 236 that receives a first button of an electronic device (not shown) and an accompanying first cover 240 that provides access to the first button when the electronic device is placed within the wearable casing 300. An outer portion of the first cover 240 can have a shape and/or structure that is substantially similar to that of the first button. An inner portion of the first cover 240 can extend through the first opening 236 towards the electronic device, so that the first cover 240 is in contact with, or flush against, the first button within the front frame member 310, 410.

As also illustrated, the front frame member 310, 410 can include a second opening 242 that receives a second button of the electronic device (not shown) therein and an accompanying second cover 246 that provides access to the second button when the electronic device is placed within the wearable device assemblies. An outer portion of the second cover 246 can have a shape and/or structure that is substantially similar to that of the second button. An inner portion of the second cover 246 can extend through the second opening 242 towards the electronic device, so that the second cover 246 is in contact with, or flush against, the second button within the front frame member 310, 410.

In certain embodiments, the second cover 246 and/or the second opening 242 can include a plurality of components to enable access to various features or functionalities of the second button, including dual-action features. The second cover 246 can include a push button 248 that is configured for lateral movement relative to the second opening 242 and the second button. Pressing the push button 248 can cause a central surface 249 (also referred to herein as "push interface") of the push button 248 to press against a central or push portion 250 of the second button 244, thereby activating any push or press functionality of the second button 244.

In certain embodiments, the second cover 246 can also include a turn dial 251 that is configured for rotational movement relative to the second opening 242 and the second button. The turn dial 251 can include a dial surface 252 (also referred to herein as "turn interface") that surrounds an outer edge of, or creates a ring around, the central surface 249 of second button 244. When the electronic device is placed within the frame member 310, 410, the dial surface 252 can be adjacent to and/or in contact with an outer or turn portion 253 of the second button 244. Rotating the turn dial 251 can cause the dial surface 252 to rotate or turn the outer portion 253 of the second button 244, thereby activating any dial-like functionality of the second button 244.

In certain embodiments, the second cover 246 includes a single component that combines the functionality of the push button 248 and the turn dial 251. More specifically, in an example of one such embodiment, the second cover 246 includes a button that is configured for lateral movement relative to the second opening and the same button is further configured for rotational movement relative to the second opening. Accordingly, when an electronic device is placed within the casing 300, 400, pressing the button can cause a central surface of the push button to press against a central or push portion of the second button of the electronic device to activate any push or press functionality of the second button. Additionally, an outer or turn portion the second button can be rotated and cause rotation of the second button of the electronic device to activate any dial-like functionality of the second button.

The openings 260, 262 can be configured according to a shape, size, number, and placement of corresponding ports in the electronic device. As described in greater detail with respect to FIGS. 13 to 17, each the openings 260, 262 can include a set of adjoining cavities that are stacked together to receive a series of inserts 266 for protecting the openings 260, 262 from water seepage and other environmental elements.

As explained above with respect to the other embodiments of this disclosure, casing 300, 400 is designed so as to provide a waterproof encasement for an electronic device. Specifically, while all functional controls of the electronic device remain accessible when installed in casing 300, 400, the casing 300, 400 prevents ingress of water into any openings of the electronic device under up to 5 atmospheres of pressure, depending on the embodiment.

As with the other embodiments described herein, the casing 300, 400 is not limited to use with a specific device. It is anticipated that many other electronic devices may be readily adapted for mounting within the disclosed and claimed wristband with only slight modifications necessary. For example, mobile phones, communication devices, calculators, heart/health monitors, GPS devices, analog/digital watches and countless other electronic gadgets may be configured to be worn within wearable casing 300, 400. Only casing 300, 400 need be adapted to the shape and controls of such gadgets. The casing 300, 400, in different embodiments, may provide one of either a quick and temporary retention of the device or a more permanent retention, as desired by the user.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art

The invention claimed is:

1. A wearable assembly for carrying an electronic device, comprising:
   a casing forming a cavity for the electronic device and having a first side opposite a second side, the casing comprising:
      a front frame member comprising:
         a front sidewall extending around the cavity,
         a front strap retaining extension extending away from the front sidewall along the first side of the casing, and
         a front strap retaining extension extending away from the front sidewall along the second side of the casing; and
      a rear frame member comprising:
         a rear sidewall extending around the cavity,
         a rear surface wall extending perpendicular to the rear sidewall to form a rear surface of the cavity,
         a rear strap retaining extension extending from the rear sidewall along the first side of the casing; and a rear strap retaining extension extending from the rear sidewall along the second side of the casing; and a strap having at least a first end and a second end;

wherein the front frame member and the rear frame member are configured to join together around the electronic device so that the front sidewall and the rear sidewall join along interfacing surfaces, and wherein the front and rear strap retaining extensions along the first side of the casing align to form a first side axial retaining hole and the front and rear strap retaining extension along the second side of the casing align to form a second side axial retaining hole; and wherein the first end of the strap is secured between the first side axial retaining hole and the second side axial retaining hole.

2. The wearable assembly of claim 1, further comprising an upper lip extending from the front sidewall away from the front sidewall and rear sidewall interfacing surface, perpendicular to the front sidewall over the cavity.

3. The wearable assembly of claim 1, wherein the rear surface wall further comprises an opening for access to the electronic device.

4. The wearable assembly of claim 3, wherein the opening in the rear surface wall allows for extricating of the electronic device from the casing.

5. The wearable assembly of claim 3, wherein the rear surface further comprises a seal around a track on the inside of a perimeter of the opening.

6. The wearable assembly of claim 1, wherein the strap is a wrist strap, such that the strap combines with the front and rear frame members to form a circular band for securing the electronic device to a user's wrist.

7. The wearable assembly of claim 1, wherein the front frame member further comprises an opening in the front sidewall for access to controls on the electronic device.

8. The wearable assembly of claim 1, wherein the front frame member further comprises a control cover having a push button component for translational input to the electronic device and a turn dial component for rotational input to the electronic device.

9. The wearable assembly of claim 8, wherein the push button component for translational input to the electronic device and the turn dial component for rotational input to the electronic device are a single component.

10. The wearable assembly of claim 1, wherein the front frame member further comprises a water-impermeable film layer covering over an opening from an inside of the front sidewall and a compressible boot surrounding a perimeter of the film layer and positioned to compress the film layer against the opening in the front sidewall when the electronic device is installed in the cavity.

11. A wearable assembly for supporting an electronic device, comprising:

a casing forming a cavity for the electronic device and having a first side opposite a second side, the casing comprising:

a front frame member comprising:

a front sidewall extending around the cavity, first and second front retaining extensions extending away from the front sidewall along the first side of the casing; and third and fourth front retaining extensions extending away from the front sidewall along the second side of the casing; and a rear frame member detachable from the front frame member and comprising a rear surface wall forming a rear surface of the cavity; and a strap having a first end and a second end;

wherein the rear frame member secures to the front frame member in a removable configuration around the electronic device; and wherein the first end of the strap is secured between the first and second front retaining extensions, and the second end of the strap is secured between the third and fourth front retaining extensions.

12. The wearable assembly of claim 11, further comprising an upper lip extending from the front sidewall away from the front sidewall and rear sidewall interfacing surface, perpendicular to the front sidewall over the cavity.

13. The wearable assembly of claim 11, wherein the rear surface wall further comprises an opening for access to the electronic device.

14. The wearable assembly of claim 13, wherein the opening in the rear surface wall allows for extricating of the electronic device from the casing.

15. The wearable assembly of claim 13, wherein the rear surface further comprises a seal around a track on the inside of a perimeter of the opening.

16. The wearable assembly of claim 11, wherein the strap is a wrist strap, such that the strap combines with the front and rear frame members to form a circular band for securing the electronic device to a user's wrist.

17. The wearable assembly of claim 11, wherein the front frame member further comprises an opening in the front sidewall for access to controls on the electronic device.

18. The wearable assembly of claim 11, wherein the front frame member further comprises a control cover having a push button component for translational input to the electronic device and a turn dial component for rotational input to the electronic device.

19. The wearable assembly of claim 18, wherein the push button component for translational input to the electronic device and the turn dial component for rotational input to the electronic device are a single component.

20. The wearable assembly of claim 11, wherein the front frame member further comprises a water-impermeable film layer covering over an opening from an inside of the front sidewall and a compressible boot surrounding a perimeter of the film layer and positioned to compress the film layer against the opening in the front sidewall when the electronic device is installed in the cavity.

* * * * *